(12) United States Patent
Gao et al.

(10) Patent No.: US 10,447,574 B2
(45) Date of Patent: Oct. 15, 2019

(54) METHOD, APPARATUS AND SYSTEM OF SELECTING ROUTING IN ASYMMETRIC LINK

(71) Applicant: Samsung Electronics Co., Ltd., Suwon-si, Gyeonggi-do (KR)

(72) Inventors: Qiang Gao, Xi'an (CN); Ying Huang, Xi'an (CN); Hong Li Ge, Xi'an (CN); Jang-su Lee, Seoul (KR); Lun Wang, Xi'an (CN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 308 days.

(21) Appl. No.: 15/372,998

(22) Filed: Dec. 8, 2016

(65) Prior Publication Data

US 2017/0207995 A1    Jul. 20, 2017

(30) Foreign Application Priority Data

Jan. 18, 2016 (CN) .......................... 2016 1 0031874

(51) Int. Cl.
| | |
|---|---|
| *H04L 12/751* | (2013.01) |
| *H04L 12/26* | (2006.01) |
| *H04L 12/733* | (2013.01) |
| *H04L 12/721* | (2013.01) |

(52) U.S. Cl.
CPC .............. *H04L 45/02* (2013.01); *H04L 43/08* (2013.01); *H04L 43/16* (2013.01); *H04L 45/123* (2013.01); *H04L 45/20* (2013.01); *H04L 45/36* (2013.01); *H04L 45/70* (2013.01); *H04L 43/10* (2013.01)

(58) Field of Classification Search
None
See application file for complete search history.

(56) References Cited

U.S. PATENT DOCUMENTS

| 7,139,268 B1* | 11/2006 | Bhagwat | H04L 47/10 370/389 |
|---|---|---|---|
| 7,680,091 B2 | 3/2010 | Draves, Jr. et al. | |
| 2001/0032272 A1* | 10/2001 | Fujita | H04L 45/12 709/241 |
| 2005/0185632 A1* | 8/2005 | Draves, Jr. | H04L 45/02 370/351 |
| 2006/0137002 A1* | 6/2006 | Forrester | H04L 45/00 726/11 |

(Continued)

*Primary Examiner* — Xavier Szewai Wong
(74) *Attorney, Agent, or Firm* — Harness, Dickey & Pierce, P.L.C.

(57) ABSTRACT

A method, apparatus and/or system of selecting a routing in an asymmetric link, in which an arbitrary intermediate node of the at least one intermediate node receives routing request information including a first link quality for a path from the source node to the arbitrary neighbor node from an arbitrary neighbor node of the arbitrary intermediate node, acquires a second link quality for a path between the arbitrary intermediate node and the arbitrary neighbor node, acquires a third link quality based on the first and second link qualities, updates the first link quality in the routing request information with the third link quality, and broadcasts an updated routing request information to other neighbor node for the destination node to determine at least one of a desirable forward path or a desirable backward path from the source node to the destination node, may be provided.

17 Claims, 22 Drawing Sheets

(56) References Cited

U.S. PATENT DOCUMENTS

| | | | |
|---|---|---|---|
| 2007/0195698 A1* | 8/2007 | Briscoe | H04L 12/14 370/235 |
| 2007/0217406 A1* | 9/2007 | Riedel | H04L 47/14 370/389 |
| 2009/0135729 A1* | 5/2009 | Saffre | H04L 45/22 370/252 |
| 2010/0011244 A1* | 1/2010 | Mohamed-Rasheed | H04L 45/04 714/18 |
| 2010/0150019 A1* | 6/2010 | Laskowski | G06F 9/4862 370/254 |
| 2011/0149844 A1* | 6/2011 | G. | H04L 45/122 370/328 |

* cited by examiner

| ROUTING TABLE | DESTINATION NODE | FORWARD NEXT HOP | BACKWARD NEXT HOP |
|---|---|---|---|
| | S | S | S |

| ROUTING TABLE | DESTINATION NODE | FORWARD NEXT HOP | BACKWARD NEXT HOP |
|---|---|---|---|
| | S | S | S |

| SAME AS ABOVE | SAVE AS ABOVE | FORWARD NEXT HOP | BACKWARD NEXT HOP |
|---|---|---|---|
| | S | 1 | 1 |

| SAME AS ABOVE | SAVE AS ABOVE | FORWARD NEXT HOP | BACKWARD NEXT HOP |
|---|---|---|---|
| | S | 3 | 3 |

| SAME AS ABOVE | DESTINATION NODE | FORWARD NEXT HOP | BACKWARD NEXT HOP |
|---|---|---|---|
| | D | 1 | 3 |

METHOD, APPARATUS AND SYSTEM OF SELECTING ROUTING IN ASYMMETRIC LINK

CROSS-REFERENCE TO RELATED APPLICATIONS

This application claims priority under 35 U.S.C. § 119 to Chinese Patent Application No. 201610031874.2 filed on Jan. 18, 2016, in the State Intellectual Property Office of the People's Republic of China, the disclosure of which is incorporated herein in its entirety by reference.

BACKGROUND

Technical Field

The present disclosure relates to wireless communication, and more particularly relates to methods, apparatuses, and/or systems of selecting a routing in an asymmetric link.

Description of the Related Art

With development of science and technology, wireless communication is becoming more and more popular, and various kinds of wireless networks are built or interconnected mainly depending on a router. The router is a hub of the wireless network, and the router determines a forwarding of a data through a routing. The term "routing" refers to an activity of moving information from a source node to a destination node through an interconnected network. In general, in a routing process, information may at least pass through one or more intermediate nodes.

In the related art, a routing is normally selected depending on a specific functional node (e.g. a sink node) or a specific topology structure (e.g. a graph routing). Thus, the routing may pose significant limitations.

SUMMARY

Some example embodiments of the present disclosure provides methods, apparatuses and/or systems of selecting a routing in an asymmetric link, for example, to solve a technical problem of existing routing selection methods that are limited by a special function node or a special topology structure.

According to an example embodiment, a method of selecting a routing in an asymmetric link, the asymmetric link including a source node, a node network, and a destination node, the node network including at least one intermediate node, includes receiving, by an arbitrary intermediate node of the at least one intermediate node, routing request information from an arbitrary neighbor node of the arbitrary intermediate node, the routing request information including a first link quality, the first link quality indicating a link quality of a path from the source node to the arbitrary neighbor node, acquiring, by the arbitrary intermediate node, a second link quality, the second link quality indicating a link quality of a path between the arbitrary intermediate node and the arbitrary neighbor node, acquiring, by the arbitrary intermediate node, a third link quality based on the second link quality and the first link quality included in the received routing request information, the third link quality indicating a link quality of a path from the source node to the arbitrary intermediate node, updating, by the arbitrary intermediate node, the first link quality in the routing request information with the third link quality, and broadcasting, by the arbitrary intermediate node, an updated routing request information to other neighbor node than the arbitrary neighbor node of the arbitrary intermediate node for the destination node to determine at least one of a forward path or an backward path from the source node to the destination node based on the received routing request information and a link quality of a path from the source node to the destination node.

According to an example embodiment, a method of selecting a routing in an asymmetric link, the asymmetric link including a source node, a node network, and a destination node, the node network including at least one intermediate node, includes receiving, by the destination node, routing request information from an arbitrary neighbor node of the destination node, the routing request information including a first link quality, the first link quality indicating a link quality of a path from the source node to the arbitrary neighbor node of the destination node, acquiring, by the destination node, a second link quality, the second link quality indicating a link quality of a path between the destination node and the arbitrary neighbor node of the destination node, acquiring, by the destination node, a third link quality according based on the second link quality and the first link quality included in the routing request information received by the destination node, and the third link quality indicating a link quality of a path from the source node to the destination node, and determining at least one of a forward path or a backward path from the source node to the destination node based on the third link quality.

According to an example embodiment, a system of selecting a routing in an asymmetric link, includes a source node, a node network, and a destination node, the node network including at least one intermediate node. The source node may be configured to transmit routing request information to the destination node via the at least one intermediate node included in the node network. An arbitrary intermediate node of the at least one intermediate node is configured to receive the routing request information including a first link quality from an arbitrary neighbor node of the arbitrary intermediate node, the first link quality indicating a link quality of a path from the source node to the arbitrary neighbor node, acquire a second link quality, the second link quality indicating a link quality of a path between the arbitrary intermediate node and the arbitrary neighbor node, acquire a third link quality based on the second link quality and the first link quality included in the received routing request information, the third link quality indicating a link quality of a path from the source node to the arbitrary intermediate node, update the first link quality in the routing request information with the third link quality, and broadcast an updated routing request information to other neighbor node than the arbitrary neighbor node of the arbitrary intermediate node. The destination node may be configured to receive routing request information including a fourth link quality from an arbitrary neighbor node of the destination node, the fourth link quality indicating a link quality of a path from the source node to the arbitrary neighbor node of the destination node, acquire a fifth link quality, the fifth link quality indicating a link quality of a path between the destination node and the arbitrary neighbor node of the destination node, acquire a sixth link quality based on a fifth link quality and the fourth link quality included in the routing request information received by the destination node, the sixth link quality indicates a link quality of a path from the source node to the destination node, and determine at least one of a forward path or a backward path from the source node to the destination node based on the sixth link quality By adopting the above methods, apparatuses and/or systems of selecting a routing in an asymmetric link, an arbitrary intermediate node can determine a desirable forward path and/or a desirable backward path from a source node to the arbitrary intermediate node based on a link quality of a path, thereby assisting the source node in selecting a desirable routing to transmit data to a destination node.

BRIEF DESCRIPTION OF THE DRAWINGS

The above and other features and advantages of example embodiments of the present disclosure will become apparent from the following detailed description, taken in conjunction with the accompanying drawings of which.

DETAILED DESCRIPTION

Various example embodiments will now be described more sufficiently with reference to the accompanying drawings, wherein some example embodiments will be illustrated in the accompanying drawings. However, the present disclosure may be implemented in different forms, and should not be construed as being limited to the example embodiments described herein. Rather, the example embodiments are merely provided so that this disclosure will be thorough and complete, and will fully convey the scope of the present disclosure sufficiently to those skilled in the art.

Figure 1:
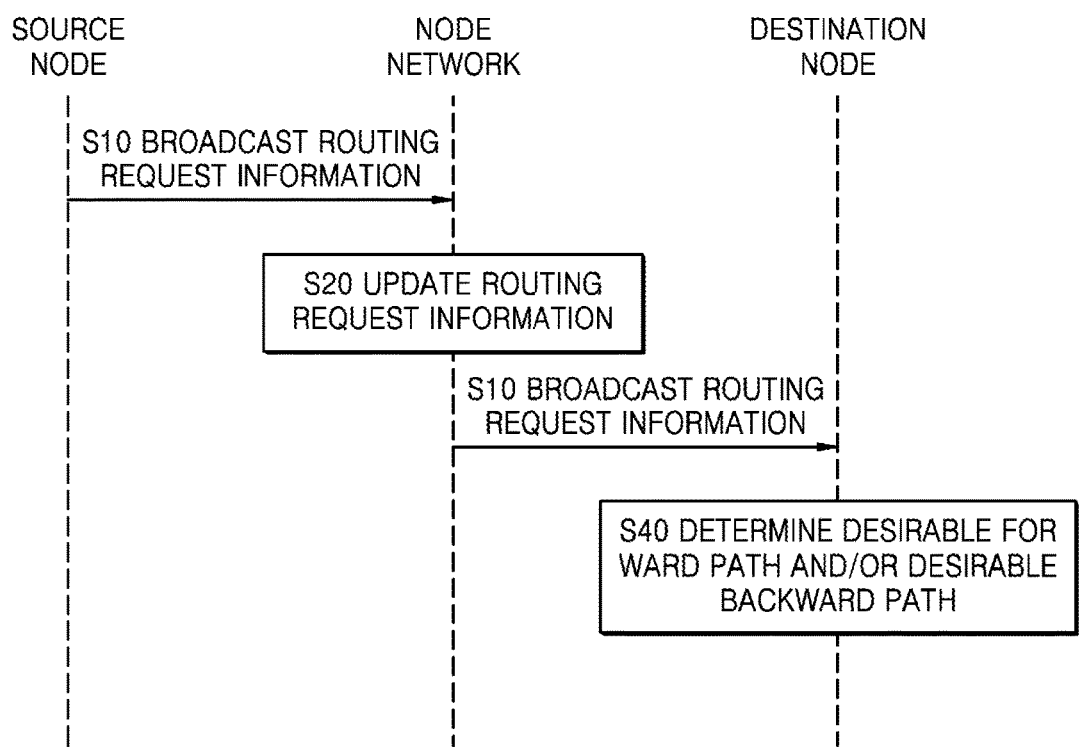
FIG. 1 illustrates a diagram of an information interaction process between a source node and a destination node in an asymmetric link according to an example embodiment of the present disclosure.

FIG. 1 illustrates a diagram of an information interaction process between a source node and a destination node in an asymmetric link according to an example embodiment of the present disclosure. It should be understood that the asymmetric link indicates that a forward link quality and a backward link quality between arbitrary neighbor second hop nodes on a path from a source node to a destination node are different from each other. Here, in the example embodiment of the present disclosure, an asymmetric link may include, for example, a source node, a node network, and a destination node. The node network may include at least one intermediate node. It should be understood that the at least one intermediate node may form a node network by means of, for example, a serial connection, a parallel connection, or a cross connection. However, ways to form a node network according to the present disclosure are not limited thereto.

Figure 2:
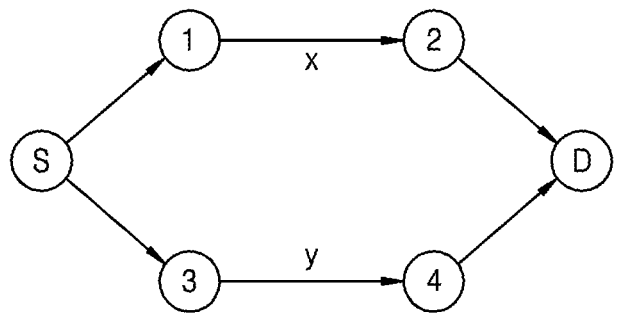
FIG. 2 illustrates an example diagram of a topology structure of an asymmetric link according to an example embodiment of the present disclosure.

FIG. 2 illustrates an example diagram of a topology structure of an asymmetric link according to an example embodiment of the present disclosure.

In a topology structure of an asymmetric link illustrated in FIG. 2, S indicates a source node of the asymmetric link, and D indicates a destination node of the asymmetric link. In the present example, a node network includes nodes 1, 2, 3, and 4; and includes two paths (also called links) from a source node S to a destination node D. Referring to FIG. 2, one path is a path x (S→1→2→D), and the other path is a path y (S→3→4→D). Here, it should be understood that, a topology structure of the asymmetric link illustrated in FIG. 2 is only an example, and the present disclosure is not limited thereto.

An information interaction process between a source node and a destination node in an asymmetric link will be described in detail referring to FIG. 1 in combination with the topology structure illustrated in FIG. 2.

Referring to FIG. 1, in step S10, a source node broadcasts routing request information.

Here, as an example, the source node S may have a local routing table, and the local routing table of the source node S may be used to store a desirable forward path from the source node S to the destination node D, or a forward next hop node of a path from the source node S to the destination node D. Before the source node S broadcasts routing request information, the source node S may detect whether the local routing table of the source node S stores a desirable forward path from the source node S to the destination node D, or stores a forward next hop node of the path from the source node S to the destination node D. If the local routing table of the source node S stores any one of the desirable forward path from the source node S to the destination node D or the forward next hop node of the path from the source node S to the destination node D, then the source node S may transmit data to the destination node D through a desirable forward path stored in the local routing table of the source node S, or the source node S may transmit data to a forward next hop node of a path to the destination node D. If the local routing table of the source node S does not store the desirable forward path from the source node S to the destination node D and the forward next hop node of the path of a source node S to the destination node D, then the source node S may broadcast the routing request information.

As an example, a format of routing request information according to an example embodiment of the present disclosure can be shown in Table 1 below,

TABLE 1

| Routing Type | Routing Table | Link Quality |
| --- | --- | --- |
| Forward | | |
| Backward | | |

As shown in Table 1, the routing request information may include, for example, a routing type, a routing table and a link quality. The routing type may include, for example, a forward type and a backward type. In a process of transmitting the routing request information from the source node S to the destination node D, a respective node on a path from the source node S to the destination node D may update the routing table and/or the link quality in the routing request information. It should be understood that, a format of the routing request information shown in Table 1 only lists a portion of the table, and thus Table 1 as shown may not show complete contents included in the routing request information, For example, Table 1 does not show contents such as a source node, a destination node, and sequence number). Further, it should also be understood that, the format of the routing request information shown in Table 1 is only an example. In some example embodiments, the routing request information may include the routing type and the link quality only, instead of the routing table. Further, those skilled in the art may adjust the content included in the routing request information according to actual needs.

In an example embodiment of the present disclosure, the broadcast routing request information may be transmitted to the destination node via a node network.

For example, in step S20, an arbitrary intermediate node from among the at least one intermediate node included in the node network may receive the routing request information from an arbitrary neighbor node of the arbitrary intermediate node, and update the routing request information.

Hereinafter, a step for an arbitrary intermediate node in a topology structure illustrated in FIG. 2 to update the routing request information is described in detailed with reference to FIG. 3.

Figure 3:
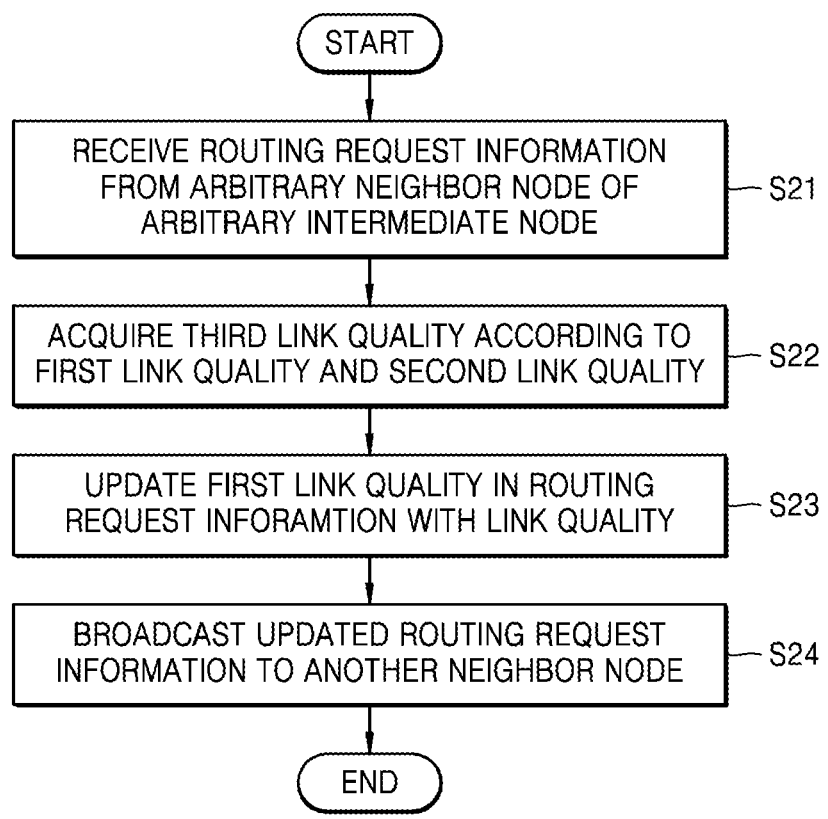
FIG. 3 illustrates a flowchart illustrating steps for an arbitrary intermediate node in a node network in FIG. 1 to update routing request information, according to an example embodiment of the present disclosure.

FIG. 3 illustrates a flowchart illustrating steps for an arbitrary intermediate node in a node network in FIG. 1 to update the routing request information, according to an example embodiment of the present disclosure.

Referring to FIG. 3, in step S21, the arbitrary intermediate node receives the routing request information from an arbitrary neighbor node of the arbitrary intermediate node. Here, the routing request information received by the arbitrary intermediate node may include a first link quality, which indicates a link quality of a path from the source node S to the arbitrary neighbor node.

It should be understood that, the arbitrary neighbor node of the arbitrary intermediate node from among the at least one intermediate node included in the node network may be the source node S, or another intermediate node from among the at least one intermediate node included in the node network. The source node or the another intermediate node may transmit the routing request information to the arbitrary intermediate node in the node network. Taking the asymmetric link as shown in FIG. 2 as an example, an intermediate node 1 receives routing request information from a source node S, and an intermediate node 2 receives the routing request information from intermediate neighboring node 1.

In step S22, a third link quality is acquired according to a second link quality acquired by the arbitrary intermediate node and a first link quality included in the received routing request information. Here, the second link quality may indicate a link quality of a path between the arbitrary intermediate node and the arbitrary neighbor node, and the third link quality may indicate a link quality of a path from the source node S to the arbitrary intermediate node.

As an example, in a step of acquiring the third link quality the arbitrary intermediate node may extract the first link quality from the received routing request information, and adds the acquired second link quality to the extracted first link quality to acquire the third link quality. Here, it should be understood that, the link quality of the path from the source node S to the arbitrary intermediate node can be obtained in various ways. The example embodiment disclosed herein only shows an example in which the link quality of the path from the source node S to the arbitrary intermediate node is acquired by, for example, summating all the routing qualities between neighbor second hop nodes on the path from the source node S to the arbitrary intermediate node. However, the present disclosure is not limited thereto, and the link quality of the path can also be obtained through other methods (e.g., multiplying).

According to some example embodiments, in step S22, a step for the arbitrary intermediate node may further include a sub step acquiring the second link quality. A link quality (e.g., the second link quality) between arbitrary neighbor second hop nodes can be acquired through various existing methods. As an example, the link quality between arbitrary neighbor second hop nodes may be obtained by interacting or transmitting a Hello message between the arbitrary neighbor second hop nodes.

Figure 4:
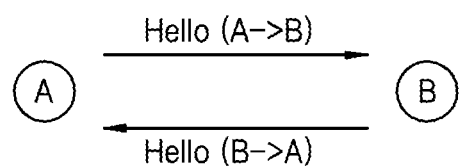
FIG. 4 illustrates a diagram of acquiring a link quality between arbitrary neighbor second hop nodes using a Hello message according to an example embodiment of the present disclosure.

FIG. 4 illustrates a diagram of acquiring a link quality between arbitrary neighbor second hop nodes using a Hello message according to an example embodiment of the present disclosure.

Referring to FIG. 4, a node A and a node B are two nodes neighboring each other. Normally, a link quality from the node A to the node B is different from a link quality from the node B to the node A. a link quality from the node A to the node B is indicated by LQ (A→B), and a link quality from the node B to the node A is indicated by LQ (B→A).

Hello (A→B) indicates that a Hello message is transmitted from the node A to the node B. The node B may determine the link quality LQ (A→B) from the node A to the node B based on the Hello message received from the node A. Then, the node B may transmit the determined link quality from the node A to the node B to the node A. Thus, the node A may acquire the link quality from the node A to the node B.

Similarly, Hello (B→A) indicates that the Hello message transmitted from the node B to the node A. The node A may determine the link quality from the node B to the node A based on the Hello message received from the node B. Then, the node A may transmit the determined link quality from the node B to the node A to the node B. Thus, the node B may acquire the link quality from the node B to the node A. By commentating the Hello message as explained above, the node A and the node B can learn the link quality from the node A to the node B and the link quality from the node B to the node A, respectively.

In step S23, the first link quality in the routing request information is updated with the third link quality.

For example, step S23 may further include a sub step of comparing the third link quality with a first threshold (or alternatively, predetermined) link quality (e.g., a sub step of determining whether the third link quality is better than the first threshold (or alternatively, predetermined) link quality). The first threshold (or alternatively, predetermined) link quality can indicate a link quality of a path from the source node S to the arbitrary intermediate node stored by the arbitrary intermediate node. As an example, the arbitrary intermediate node may have a local routing cache table, and the first threshold (or alternatively, predetermined) link quality can be stored in the local routing cache table of the arbitrary intermediate node.

For example, when the third link quality is better than the first threshold (or alternatively, predetermined) link quality, the third link quality may be used to update the first link quality in the routing request information. Further, the third link quality may be written into the local routing cache table of the arbitrary intermediate node, and the third link quality may be used to update the first threshold (or alternatively, predetermined) link quality in the local routing cache table of the arbitrary intermediate node.

When the third link quality is not better than the first threshold (or alternatively, predetermined) link quality, the arbitrary intermediate node may not update the first link quality in the routing request information. Accordingly, the routing request information may not be forwarded (e.g., the routing request information may not be broadcasted to neighbor node(s) other than the arbitrary neighbor node (e.g., an immediately neighboring node) of the arbitrary intermediate node). Thus, the routing request information may be discarded. In this case, the arbitrary intermediate node may not update the first threshold (or alternatively, predetermined) link quality in the local routing cache table of the arbitrary intermediate node.

In some example embodiments, the first link quality may include a first forward link quality, the third link quality may include a third forward link quality, the first threshold (or alternatively, predetermined) link quality may include a first threshold (or alternatively, predetermined) forward link quality. The arbitrary intermediate node can compare the third forward link quality with the first threshold (or alternatively, predetermined) forward link quality. When the third forward link quality is better than the first threshold (or alternatively, predetermined) forward link quality, the third forward link quality may be used to update the first forward link quality in the routing request information. The third forward link quality may also be used to update the first threshold (or alternatively, predetermined) forward link quality in the local routing cache table of the arbitrary intermediate node. When the third forward link quality is not better than the first threshold (or alternatively, predetermined) forward link quality, the arbitrary intermediate node may not update the first forward link quality in the routing request information, and may not update the first threshold (or alternatively, predetermined) forward link quality in the local routing cache table of the arbitrary intermediate node.

In some example embodiments, the first link quality may include a first backward link quality, the third link quality may include a third backward link quality, the first threshold (or alternatively, predetermined) link quality may include a first threshold (or alternatively, predetermined) backward link quality. The arbitrary intermediate node may compare the third backward link quality with the first threshold (or alternatively, predetermined) backward link quality. When the third backward link quality is better than the first threshold (or alternatively, predetermined) backward link quality, the third backward link quality may be used to update the first backward link quality in the routing request information. The third backward link quality may be used to update the first threshold (or alternatively, predetermined) backward link quality in the local routing cache table of the arbitrary intermediate node. When the third backward link quality is not better than the first threshold (or alternatively, predetermined) backward link quality, the arbitrary intermediate node may not update the first backward link quality in the routing request information, and may not update the first threshold (or alternatively, predetermined) backward link quality in the local routing cache table of the arbitrary intermediate node.

In the step for the arbitrary intermediate node to update the first link quality in the routing request information with the third link quality, the arbitrary intermediate node may update the first link quality in the routing request information by replacing the first link quality in the routing request information directly with the third link quality. The routing request information may include a sum of the link qualities between all neighbor second hop nodes on the path from the source node S to the arbitrary intermediate node. That is, the arbitrary intermediate node may update the sum of the link qualities between all neighbor second hop nodes on the path from the source node S to the arbitrary intermediate node in the routing request information.

Further, the arbitrary intermediate node may additionally put the second link quality into the routing request information, to update a first link quality in the routing request information. Thus, the routing request information may include independent link qualities between all neighbor second hop nodes on the path from the source node to the arbitrary intermediate node.

In some example embodiments, the arbitrary intermediate node may combine the above two methods. For example, the arbitrary intermediate node may additionally put the second link quality into the routing request information, and may update the sum of link qualities between all neighbor second hop nodes on the path from the source node S to the arbitrary intermediate node in the routing request information by using the third link quality.

The asymmetric link routing may include, for example, a source routing mode and a distance vector routing mode. In the source routing mode, the source node knows each intermediate node on a path to the destination node. In the distance vector routing mode, the source node does not know each intermediate node on the pass to the destination node. In the distance vector routing mode, each of the respective nodes only know a next hop node reaching the destination node. According to characteristics of the above two routing modes, in step S23, the methods for the arbitrary intermediate node to update the routing request information may be different.

In some example embodiment of step S23, the asymmetric link routing is in the source routing mode, and the routing request information may include a routing type, a routing table, and a link quality (as shown in Table 1). At this time, the routing table may be used to record all the nodes on a path from the source node S to an arbitrary neighbor node of the arbitrary intermediate node that receives the routing request information. The term "neighbor node" refers to a node transmitting the routing request information to a node receiving the routing request information.

In this case, when the third link quality is better than the first threshold (or alternatively, predetermined) link quality, the arbitrary intermediate node may not only update the first link quality in the routing request information by using the third link quality, but also add the arbitrary intermediate node into a routing table, to update the routing request information. Thus, a path from the source node to the arbitrary intermediate node may be acquired. When the third link quality is not better than the first threshold (or alternatively, predetermined) link quality, the arbitrary intermediate node may not update the routing table.

In some other example embodiments, the routing table in the routing request information may include a forward routing table. In this case, when the third forward link quality is better than the first threshold (or alternatively, predetermined) forward link quality, the arbitrary intermediate node may be added into the forward routing table. When the third forward link quality is not better than the first threshold (or alternatively, predetermined) forward link quality, the arbitrary intermediate node may not update the forward routing table.

Similarly, the routing table in the routing request information may include a backward routing table. In this case, when the third backward link quality is better than the first threshold (or alternatively, predetermined) backward link quality, the arbitrary intermediate node may be added into the backward routing table. When the third backward link quality is not better than the first threshold (or alternatively, predetermined) backward link quality, the arbitrary intermediate node may not update the backward routing table.

Hereinafter, by taking a node 1 and a node 2 in the topology structure illustrated in FIG. 2 as an example, a step for an arbitrary intermediate node to update the routing request information in a source routing mode is described in detailed with reference to FIGS. 5 and 6.

Figure 5:
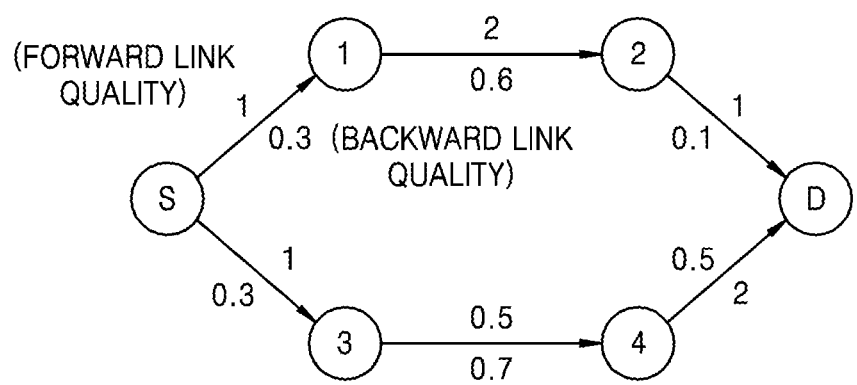
FIG. 5 illustrates an example diagram for a node 1 in the topology structure illustrated in FIG. 2 to update routing request information according to an example embodiment of the present disclosure.

FIG. 5 illustrates an example diagram for a node 1 in the topology structure illustrated in FIG. 2 to update routing request information according to an example embodiment of the present disclosure. For example, a link quality in the routing request information is a sum of the link qualities of a path from a source node S to a neighbor node of a node receiving the routing request information.

In an example shown in FIG. 5, a forward link quality and a backward link quality between all neighbor second hop nodes on two paths from the source node S to the destination node D are marked (referring to numerals marked on both sides of each of direction lines in FIG. 5). When a forward link quality (e.g., a third forward link quality) of a path from the source node S to the node 1 is better than a forward link quality (e.g., a first threshold (or alternatively, predetermined) forward link quality) of a path from the source node S to the node 1 stored in a local routing cache table of the node 1, the node 1 may be added into the forward routing table. In this case, the forward routing table may include the path from the source node S to the node 1 (e.g., S→1), and the forward link quality between the source node S and the node 1 may be added into the routing request information so as to update the routing request information. Here, since a neighbor node of the node 1 is the source node, a value of the first forward link quality in the routing request information is null. Thus, only the forward link quality between the source node S and the node 1 may be added to the routing request information.

Accordingly, when a backward link quality (e.g., a third backward link quality) of the path from the source node S to the node 1 is better than a backward link quality (e.g., a first threshold (or alternatively, predetermined) backward link quality) of the path from the source node S to the node 1 stored in the local routing cache table of the node 1, the node 1 may be added into the backward routing table. In this case, the backward routing table may include a path from the node 1 to the source node S (e.g., 1→S) and the backward link quality between the source node S and the node 1 may be added into the routing request information so as to update a routing request information (the routing request information shown in FIG. 5 is the routing request information acquired after updating the node 1), then the updated routing request information may be broadcasted to a neighbor node (for example, a node 2) of the node 1.

Figure 6:
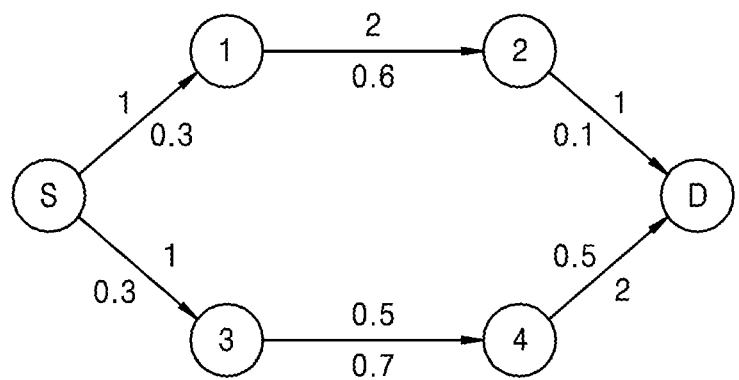
FIG. 6 illustrates an example diagram for a node 2 in the topology structure illustrated in FIG. 2 to update routing request information according to an example embodiment of the present disclosure.

FIG. 6 illustrates an example diagram for a node 2 in the topology structure illustrated in FIG. 2 to update routing request information according to an example embodiment of the present disclosure.

As shown in FIG. 6, the node 2 extracts a forward link quality (e.g., a first forward link quality) of the path from the source node S to the node 1 from the routing request information, and adds the first forward link quality with a forward link quality (e.g., a second forward link quality) between the node 1 and the node 2, so as to acquire a forward link quality (e.g., a third forward link quality) of a path from the source node S to the node 2. Then, the third forward link quality may be compared with a forward link quality (a first threshold (or alternatively, predetermined) forward link quality) of the path from the source node S to the node 2 stored in the local routing cache table of the node 2. When the third forward link quality is better than the first threshold (or alternatively, predetermined) forward link quality, the node 2 may be added into the forward routing table. At this time, the forward routing table may include the path from the source node S to the node 2 (namely S→1→2), and the first forward link quality in the routing request information may be updated by using the third forward link quality so as to update the routing request information. At this time, the forward link quality included in the routing request information may be a sum of the forward link qualities of the path from the source node S to the node 2 (e.g., 1+2) (the routing request information shown in FIG. 6 is the routing request information acquired after updating the node 2). The updated routing request information may be forwarded to a neighbor node of the node 2 (for example, the updated routing request information is forwarded to a destination node D).

Accordingly, the node 2 also extracts a backward link quality (a first backward link quality) of the path from the source node S to the node 1 from the routing request information, and adds the first backward link quality with a backward link quality (a second backward link quality) between the node 1 and the node 2, so as to acquire a backward link quality (a third backward link quality) of the path from the source node S to the node 2. Then, the third backward link quality may be compared with a backward link quality (a first threshold (or alternatively, predetermined) backward link quality) of the path from the source node S to the node 2 stored in the local routing cache table of the node 2. When the third backward link quality is better than the first threshold (or alternatively, predetermined) backward link quality, the node 2 may be added into a backward routing table. At this time, the backward routing table may include a path from the node 2 to the source node (namely 2→1→S), and a first backward link quality in the routing request information may be updated by using the third backward link quality so as to update the routing request information. At this time, a backward link quality included in the routing request information may be a sum of the backward link qualities of a path from the source node S to the node 2 (e.g., 0.3+0.6) (the routing request information shown in FIG. 6 is the routing request information acquired after updating the node 2). The updated routing request information may be forwarded to a neighbor node of the node 2 (for example, the updated routing request information is forwarded to the destination node D).

In a second example embodiment of step S23, in a distance vector routing mode, the arbitrary intermediate node only needs to know a next hop node to the destination node, without knowing each intermediate node passing from the source node to the destination node. Thus, the routing request information in the distance vector routing mode can only include a routing type and a link quality, and do not include a path from the source node to the arbitrary intermediate node (e.g., not including a routing table in Table 1). In this way, an information transmission amount between respective nodes may be effectively reduced.

For example, in the distance vector routing mode, the arbitrary intermediate node can have a local routing table to the source node. As an example, a local routing table to the source node of the arbitrary intermediate node only includes a next hop node of a path to the source node of the arbitrary intermediate node, and does not include all the nodes on a path from the arbitrary intermediate node to the source node.

For example, a step for the arbitrary intermediate node to update a local routing table to the source node of the arbitrary intermediate node according to a link quality of the path from the source node to the arbitrary intermediate node may be conducted as follows. When the third link quality is better than the first threshold (or alternatively, predetermined) link quality, the arbitrary neighbor node of the arbitrary intermediate node may be taken as a next hop node of a path to the source node of the arbitrary intermediate node, and may be added into a local routing table to the source node of the arbitrary intermediate node so as to update the local routing table to the source node of the arbitrary intermediate node.

In some other example embodiments, the local routing table to the source node of the arbitrary intermediate node can include a forward next hop node to the source node of the arbitrary intermediate node. Thus, when the third backward link quality is better than the first threshold (or alternatively, predetermined) backward link quality, the arbitrary intermediate node may take the arbitrary neighbor node of the arbitrary intermediate node as a forward next hop node to the source node of the arbitrary intermediate node, and may add the arbitrary neighbor node of the arbitrary intermediate node into the local routing table to the source node of the arbitrary intermediate node so as to update the local routing table to the source node of the arbitrary intermediate node. Here, the forward next hop node to the source node of the arbitrary intermediate node may refer to a node transmitting the routing request information to the arbitrary intermediate node on a path where a backward link quality from the source node to the arbitrary intermediate node is desirable.

Accordingly, the local routing table to the source node of the arbitrary intermediate node can also include a backward next hop node to the source node of the arbitrary intermediate node. When the third forward link quality is better than the first threshold (or alternatively, predetermined) forward link quality, the arbitrary intermediate node may take the arbitrary neighbor node of the arbitrary intermediate node as a backward next hop node to the source node of the arbitrary intermediate node, and add the arbitrary neighbor node of the arbitrary intermediate node into the local routing table to the source node of the arbitrary intermediate node so as to update the local routing table to the source node of the arbitrary intermediate node. Here, the backward next hop node to the source node of the arbitrary intermediate node may refer to a node transmitting the routing request information to the arbitrary intermediate node on a path where a forward link quality from the source node to the arbitrary intermediate node is desirable.

As an example, a local routing table to the source node of the arbitrary intermediate node may have a format as shown in a Table 2 below.

TABLE 2

Routing Table

| Destination Node | Forward Next Hop | Backward Next Hop |
|---|---|---|
| S | | |

As shown in Table 2, the local routing table to the source node of the arbitrary intermediate node can include a destination node (here, in a process of transmitting the routing request information from a source node to a destination node, a local routing table may be updated by taking the source node as the destination node), a forward next hop node to the source node of the arbitrary intermediate node, and a backward next hop node to the source node of the arbitrary intermediate node. In a process of transmitting the routing request information from the source node to the destination node, a respective intermediate node on a path from the source node to the destination node may not only update a link quality in the routing request information, but also may update a forward next hop and a backward next hop in a local routing table to the source node of the respective intermediate node. It should be understood that, the format of the local routing table shown in Table 2 only lists a part that is desired to be added in an example embodiment of the present disclosure, and what is shown in Table 2 is not a complete list of contents included in the local routing table. For example, Table 2 may further include a source node, a destination node, and/or a sequence number included in an existing local routing table).

Hereinafter, by taking the node 1, the node 2, the node 3 and the node 4 in a topology structure illustrated in FIG. 2 as an example, a process for an arbitrary intermediate node to update a local routing table to the source node of the arbitrary intermediate node in a distance vector routing mode will be described in detail with reference to FIGS. 7 and 8.

Figure 7:
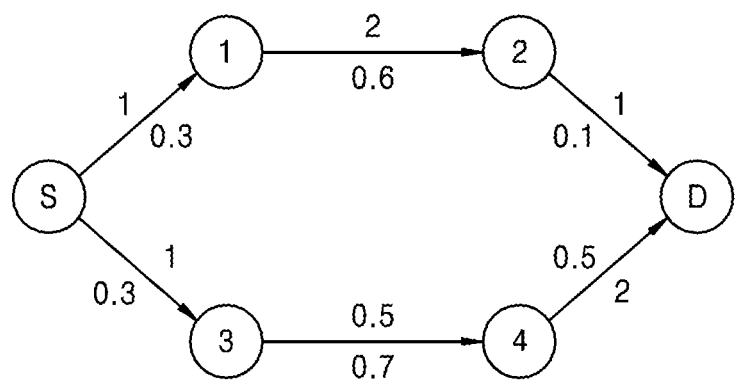
FIG. 7 illustrates an example diagram for a node 1 and a node 3 in the topology structure illustrated in FIG. 2 to update a respective local routing table to a source node according to an example embodiment of the present disclosure.

FIG. 7 illustrates an example diagram for a node 1 and a node 3 in the topology structure illustrated in FIG. 2 to update a respective local routing table to a source node according to an example embodiment of the present disclosure.

In an example shown in FIG. 7, when a backward link quality (e.g., 0.3) of a path from a source node S to a node 1 is better than a backward link quality of the path from the source node S to the node 1 stored in a local routing cache table of the node 1, the node 1 may take a neighbor node (e.g., the source node S) of the node 1 as a forward next hop node to the source node of the node 1, and may add the neighbor node into a local routing table to the source node of the node 1 so as to update the local routing table to the source node of the node 1 (the updated local routing table to the source node of the node 1 is shown in an upper table in FIG. 7).

Accordingly, when a forward link quality (e.g., 1) of a path from the source node S to the node 1 is better than a forward link quality of the path from the source node S to the node 1 stored in the local routing cache table of the node 1, the node 1 may take a neighbor node (e.g., the source node S) of the node 1 as a backward next hop node to the source node S of the node 1, and may add the neighbor node into the local routing table of the node 1 so as to update the local routing table to the source node of the node 1. Here, because the node 1 in the topology structure illustrated in FIG. 2 only receives the routing request information from the source node S, the node 1 may set both a forward next hop node and a backward next hop node from the destination node D to the source node S in the local routing table to the source node of the node 1 as S.

A process for a node 3 to update a local routing table to the source node of the node 3 may be the same or similar to the process for the node 1. Thus, the process for the note 3 will not be repeated in the present disclosure. The updated local routing table to the source node of the node 3 is shown in a lower table in FIG. 7.

Figure 8:
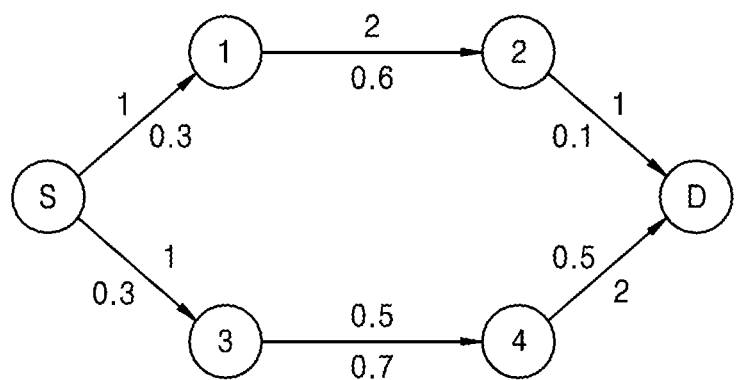
FIG. 8 illustrates an example diagram for a node 2 and a node 4 in the topology structure illustrated in FIG. 2 to update a respective local routing table to a source node according to an example embodiment of the present disclosure.

FIG. 8 illustrates an example diagram for a node 2 and a node 4 in the topology structure illustrated in FIG. 2 to update a respective local routing table to a source node according to an example embodiment of the present disclosure.

As shown in FIG. 8, when a backward link quality (e.g., 0.3+0.6) of a path from a source node S to a node 2 is better than backward link quality of the path from the source node S to the node 2 stored in a local routing cache table of the node 2, the node 2 may take a neighbor node (e.g., the node 1) of the node 2 as a forward next hop node to the source node S of the node 2, and add the neighbor node into a local routing table to the source node of the node 2 so as to update the local routing table to the source node of the node 2. The updated local routing table to the source node of the node 2 is shown in an upper table in FIG. 8.

Accordingly, when a forward link quality (e.g., 1+2) of the path from the source node S to the node 2 is better than a forward link quality of the path from the source node S to the node 2 stored in the node 2, the node 2 may take a neighbor node (e.g., the node 1) of the node 2 as a backward next hop node to the source node S of the node 2, and add the neighbor node into a local routing table to the source node of the node 2 so as to update the local routing table to the source node of the node 2. Here, because the node 2 in a topology structure illustrated in FIG. 2 only receives the routing request information from the node 1, the node 2 may set both a forward next hop node and a backward next hop node from the destination node D to the source node S in a local routing table to the source node of the node 2 as the node 1.

A process for a node 4 to update a local routing table to the source node of the node 4 may be the same as or similar to the process for the node 2. Thus, the process for the node 4 will not be repeated in the present disclosure. The updated local routing table to the source node of the node 4 is shown in a lower table in FIG. 8. It should be understood that, the routing tables of the respective nodes shown in FIGS. 7 and 8 are only examples, and the present disclosure is not limited to these examples.

Returning to FIG. 1, in step S30, the arbitrary intermediate node may broadcast the updated routing request information to one or more neighbor nodes other than the arbitrary neighbor node of the arbitrary intermediate node so that the destination node may determine a desirable forward path and/or a desirable backward path from the source node to the destination node according to a link quality of the path from the source node to the destination node based on the received routing request information.

At this time, the arbitrary intermediate node may determine a desirable forward path and/or a desirable backward path from the source node to the arbitrary intermediate node among paths from the source node to the destination node according to the link quality of the path from the source node to the arbitrary intermediate node.

In step S40, the destination node may determine the desirable forward path and/or the desirable backward path from the source node to the destination node according to a link quality of the path from the source node to the destination node based on the received routing request information.

Hereinafter, a step (e.g., step S40) for the destination node to determine the desirable forward path and/or the desirable backward path from the source node to the destination node based on the link quality of the path from the source node to the destination node will be described in detail with reference to FIG. 9.

Figure 9:
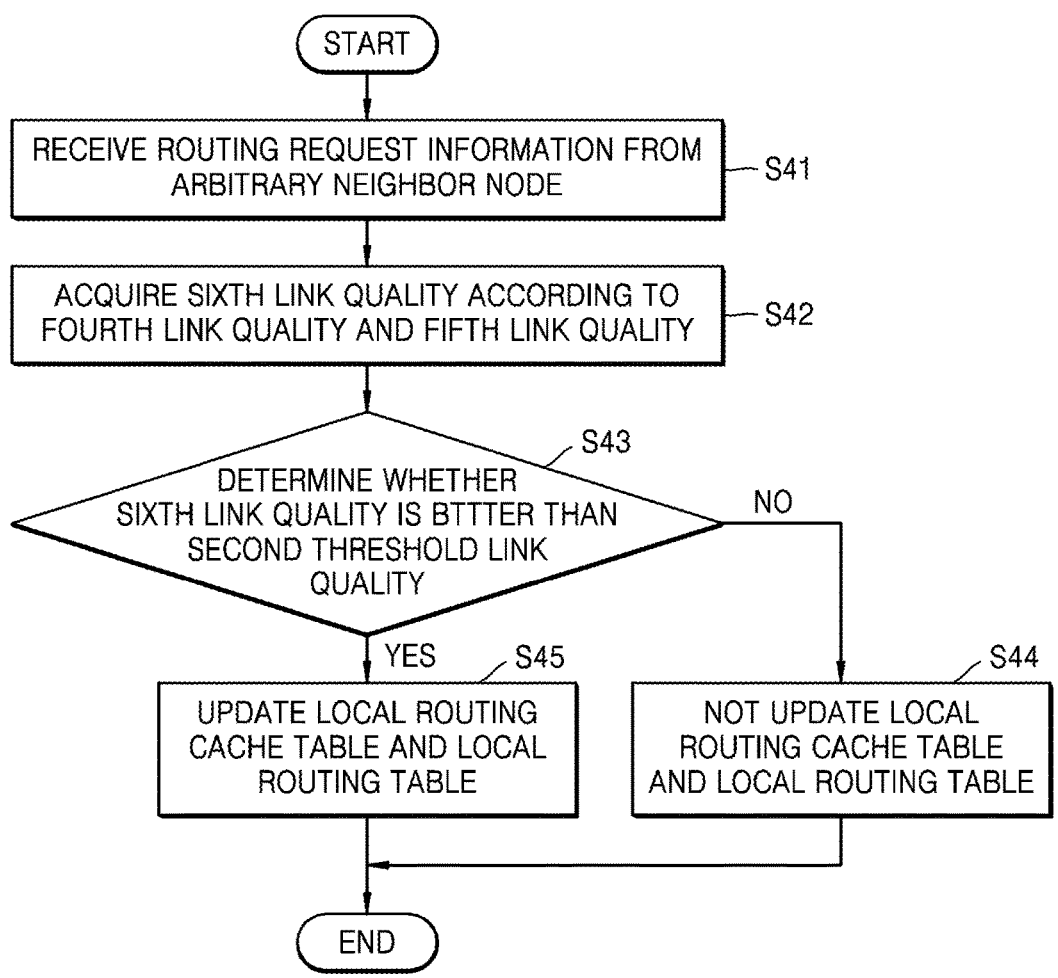
FIG. 9 illustrates a flowchart illustrating steps for a destination node in FIG. 1 to determine a desirable forward path and/or a desirable backward path from a source node to a destination node according to an example embodiment of the present disclosure.

FIG. 9 illustrates a flowchart illustrating steps for a destination node in FIG. 1 to determine a desirable forward path and/or desirable backward path from a source node to a destination node according to an example embodiment of the present disclosure.

Referring to FIG. 9, in step S41, the destination node receives the routing request information from an arbitrary neighbor node of the destination node. Here, the routing request information received by the destination node may include a fourth link quality, which indicates a link quality of a path from the source node to the arbitrary neighbor node of the destination node.

Hereinafter, the step S41 for the destination node to receive the routing request information from the neighbor node of the destination node as illustrated in FIG. 9 will be described in detail with reference to FIG. 10.

Figure 10:
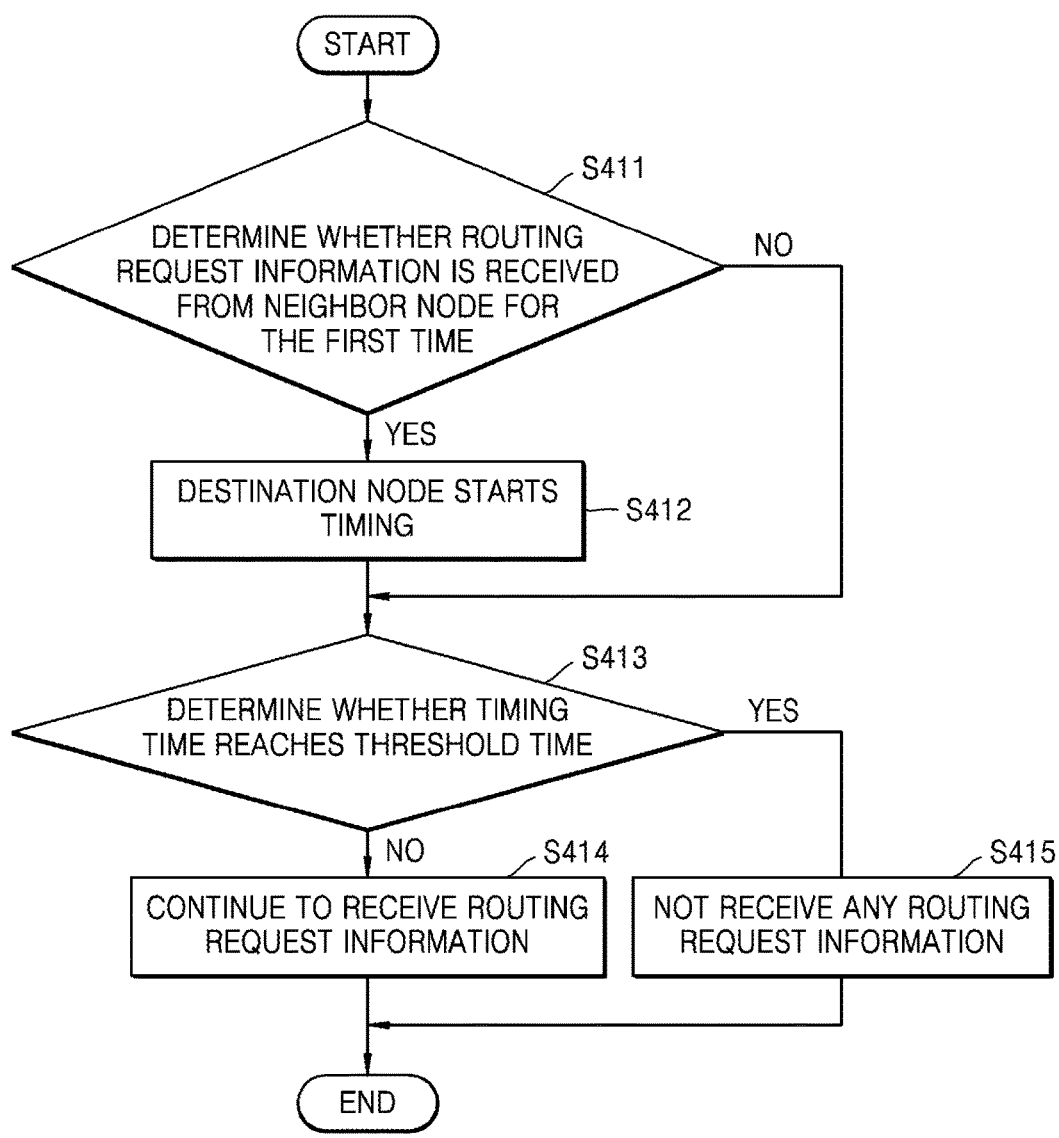
FIG. 10 illustrates a flowchart illustrating steps for a destination node in FIG. 9 to receive routing request information from a neighbor node according to an example embodiment of the present disclosure.

FIG. 10 illustrates a flowchart illustrating steps for the destination node in FIG. 9 to receive routing request information from a neighbor node according to an example embodiment of the present disclosure.

Referring to FIG. 10, in step S411, whether the destination node receives the routing request information from the neighbor node for the first time is determined.

If the destination node receives the routing request information from the neighbor node for the first time, the destination node may start a timing (S412).

For example, the destination node can include a timer. When the destination node receives the routing request information from the neighbor node for the first time, the timer in the destination node may be initiated to start the timing.

If the destination node does not receive the routing request information from the neighbor node for the first time, whether a timing time reaches a threshold (or alternatively, predetermined) time may be determined (S413).

If the timing time does not reach the threshold (or alternatively, predetermined) time (e.g., the timing time falls within the threshold (or alternatively, predetermined) time), the destination node may continue to receive the routing request information from the neighbor node so as to update a local routing table and a local routing cache table of the destination node according to a link quality of a path from the source node to the destination node (S414).

If the timing time reaches the threshold (or alternatively, predetermined) time (e.g., the timing time goes beyond the threshold time), the destination node may no longer receive any routing request information (S415).

Returning to FIG. 9, in step S42, the destination node acquires a sixth link quality according to a fifth link quality acquired by the destination node and a fourth link quality included in the routing request information received by the destination node. Here, the fifth link quality may indicate a link quality of a path between the destination node and the arbitrary neighbor node of the destination node, the sixth link quality may indicate a link quality of a path from the source node to the destination node. For example, the destination node may acquire the fifth link quality through various existing methods. For example, the destination node may acquire the fifth link quality through a Hello message by adopting the method shown in FIG. 4.

For example, a step for the destination node to acquire the sixth link quality may include (1) that the destination node extracts a fourth link quality from the received routing request information, and (2) that the destination node adds the fifth link quality acquired by the destination node with the fourth link quality to acquire the sixth link quality. Here, it should be understood that, the link quality of the path from the source node to the destination node may be acquired through various existing methods. In the example embodiment of the present disclosure, a step of acquiring a link quality of a path from the source node to the destination node by summating the link qualities between all neighbor second hop nodes on the path from the source node to the destination node is only an example, and the present disclosure is not limited thereto. The link quality of the path may be acquired through multiplying or other methods.

For example, a step for the destination node to acquire the sixth link quality can further include (1) determining a desired (or alternatively, predetermined) weight according to a number of nodes included in the path from the source node to the destination node, and (2) applying the desired weight to the sixth link quality. For example, the desired weight may be applied to a sum of link qualities of the path from the source node to the destination node. The larger the number of nodes included in the path from the source node to the destination node is, the bigger a negative influence of the desired weight on the sixth link quality will be.

It should be understood that, in some example embodiments of the present disclosure, a good or bad link quality may be reflected by a value of the link quality of the path from the source node to the destination node. However, the present disclosure is not limited thereto. A good or bad link quality of the path from the source node to the destination node may be reflected through various existing methods (e.g., a distance value or a delay time from the source node to the destination node). That is, the desired weight applied to the link quality of the path from the source node to the destination node may not refer to a reduction in the link quality of the path from the source node to the destination node as the number of nodes included in the path from the source node to the destination node increases. In some example embodiments, the desired weight applied to the link quality of the path from the source node to the destination node may also refer to an improvement in the link quality of the path from the source node to the destination node as the number of nodes included in the path from the source node to the destination node increases, as long as the negative influence on the link quality is increased through the desired weight as the number of nodes included in the path from the source node to the destination node increases.

In step S43, the destination node compares the sixth link quality with a second threshold (or alternatively, predetermined) link quality. For example, step S43 determines whether the sixth link quality is better than the second threshold (or alternatively, predetermined) link quality. Here, the second threshold (or alternatively, predetermined) link quality may indicate a link quality of the path from the source node to the destination node stored by the destination node.

As an example, the destination node may have a local routing cache table, and the local routing cache table of the destination node may be used to store the second threshold (or alternatively, predetermined) link quality. In this case, the destination node may compare the sixth link quality with the second threshold (or alternatively, predetermined) link quality stored in the local routing cache table of the destination node, in step S43.

When the sixth link quality is not better than the second threshold (or alternatively, predetermined) link quality stored in the local routing cache table of the destination node, the destination node may not update the second desired (or alternatively, predetermined) link quality stored in the local routing cache table of the destination node (step S44).

When the sixth link quality is better than the second threshold (or alternatively, predetermined) link quality stored in the local routing cache table of the destination node, the sixth link quality may be written into the local routing cache table of the destination node so as to update the second threshold (or alternatively, predetermined) link quality in the local routing cache table of the destination node (step S45).

In some example embodiments, the sixth link quality may include a sixth forward link quality, the second desired (or predetermined) link quality may include a second threshold (or alternatively, predetermined) forward link quality. In this case, the destination node may compare the sixth forward link quality with the second threshold (or alternatively, predetermined) forward link quality stored in a local routing cache table of the destination node; when the sixth forward link quality is better than the second threshold (or alternatively, predetermined) forward link quality, the second threshold (or alternatively, predetermined) forward link quality in the local routing cache table of the destination node may updated by using the sixth forward link quality. When the sixth forward link quality is not better than the second threshold (or alternatively, predetermined) forward link quality, the second threshold (or alternatively, predetermined) forward link quality in the local routing cache table of the destination node may not be updated.

Accordingly, the sixth link quality may further include a sixth backward link quality, the second threshold (or alternatively, predetermined) link quality may further include a second threshold (or alternatively, predetermined) backward link quality. In this case, the destination node may compare the sixth backward link quality with the second threshold (or alternatively, predetermined) backward link quality stored in the local routing cache table of the destination node. When the sixth backward link quality is better than the second threshold (or alternatively, predetermined) backward link quality, the second threshold (or alternatively, predetermined) backward link quality in the local routing cache table of the destination node is updated by using the sixth backward link quality. When the sixth backward link quality is not better than the second threshold (or alternatively, predetermined) backward link quality, the second threshold (or alternatively, predetermined) backward link quality in the local routing cache table of the destination node is not updated.

For example, the destination node may not only have the local routing cache table, but also have a local routing table. With respect to a case where step S23 uses the source routing mode, the local routing table of the destination node may be used to record all nodes passing from the source node to the destination node. The destination node may determine whether to update the local routing table of the destination node according to the sixth link quality.

For example, when the sixth link quality is better than the second threshold (or alternatively, predetermined) link quality stored in the local routing cache table of the destination node, the destination node may add the destination node into a routing table of a routing request message so as to acquire the path from the source node to the destination node, and may store the path from the source node to the destination node into the local routing table of the destination node so as to update the local routing table of the destination node. When the sixth link quality is not better than the second threshold (or alternatively, predetermined) link quality stored in the local routing cache table of the destination node, the destination node may not update the local routing table of the destination node.

As an example, the local routing table of the destination node may include a forward routing table. When the sixth forward link quality is better than the second threshold (or alternatively, predetermined) forward link quality stored in the local routing cache table of the destination node, the destination node may store the path from the source node to the destination node into the forward routing table of the destination node so as to update the forward routing table of the destination node, and may take the path from the source node to the destination node stored in the forward routing table as a desirable forward path from the source node to the destination node. When the sixth forward link quality is not better than the second threshold (or alternatively, predetermined) forward link quality, the forward routing table of the destination node may not be updated.

Accordingly, the local routing table of the destination node may further include a backward routing table. When the sixth backward link quality is better than the second threshold (or alternatively, predetermined) backward link quality stored in the local routing cache table of the destination node, the destination node may store the path from the destination node to the source node into the backward routing table of the destination node so as to update the backward routing table of the destination node, and may take the path from the destination node to the source node stored in the backward routing table as a desirable backward path from the source node to the destination node. When the sixth backward link quality is not better than the second threshold (or alternatively, predetermined) backward link quality, the backward routing table of the destination node may not be updated.

Figure 11:
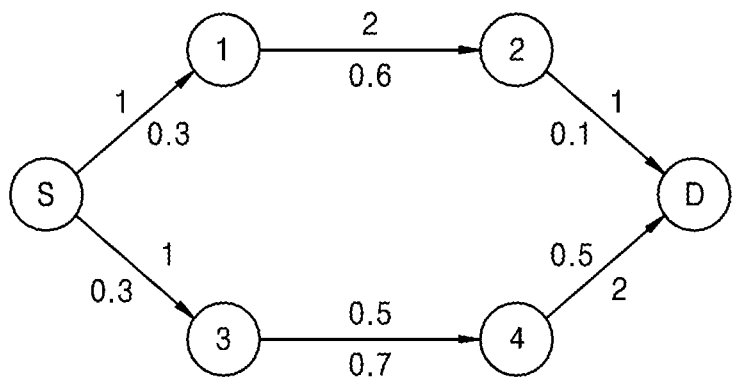
FIG. 11 illustrates an example diagram for a destination node in a topology structure illustrated in FIG. 2 to process the received routing request information according to an example embodiment of the present disclosure.

FIG. 11 illustrates an example diagram for a destination node in a topology structure illustrated in FIG. 2 to process the received routing request information according to an example embodiment of the present disclosure.

As shown in FIG. 11, a destination node D receives routing request information from a node 2, and may also receive another routing request information from a node 4. With respect to the routing request information received from the node 2, the destination node D may first extract a forward link quality (e.g., a fourth forward link quality) of a path from a source node S to the node 2 from the routing request information, add a forward link quality (e.g., a fifth forward link quality) between the node 2 and the destination node D with the fourth forward link quality so as to acquire a forward link quality (e.g., a sixth forward link quality of 1+2+1) of a path from the source node S to the destination node D, and then compares the sixth forward link quality with the second threshold (or alternatively, predetermined) forward link quality stored in the local routing cache table of the destination node. When the sixth forward link quality is better than the second predetermined forward link quality stored in the local routing cache table of the destination node, the destination node D may add the destination node D into a routing table of a routing request message so as to acquire a path from the source node S to the destination node D, and may store the path from the source node S to the destination node D into a forward routing table of the destination node D so as to update the forward routing table of the destination node D. Further, the destination node D further may update the second threshold (or alternatively, predetermined) forward link quality in the local routing cache table of the destination node by using the sixth forward link quality.

Accordingly, the destination node D may further extract a backward link quality (e.g., a fourth backward link quality) of a path from the source node S to the node 2 from the routing request information, add a backward link quality (e.g., a fifth backward link quality) between the node 2 and the destination node D with the fourth backward link quality so as to acquire a backward link quality (e.g., a sixth backward link quality of 0.3+0.6+0.1) of a path from the source node S to the destination node D, and then compares the sixth backward link quality with the second threshold (or alternatively, predetermined) backward link quality stored in the local routing cache table of the destination node D. When the sixth backward link quality is better than the second threshold (or alternatively, predetermined) backward link quality stored in the local routing cache table of the destination node D, the destination node D may add the destination node D into a routing table of the routing request message so as to acquire a path from the destination node D to the source node S, and may store the path from the destination node D to the source node S into a backward routing table of the destination node so as to update the backward routing table of the destination node D. An upper table shown in FIG. 11 is a diagram of the routing request information after the destination node processes the routing request information received from the node 2.

A lower table shown in FIG. 11 is a diagram of the routing request information after the destination node D processes the routing request information received from a node 4. In the present example embodiment, a forward link quality of a path S→3→4→D from a source node S to a destination node D is 2 (e.g., 1+0.5+0.5), a backward link quality of a path S→3→4→D from the source node S to the destination node D is 3 (e.g., 0.3+0.7+2).

The destination node D may receive the routing request information from different intermediate nodes (e.g., different neighbor nodes) in a time sequence. For example, assuming that the destination node D receives the routing request information transmitted by a node 2 first, if a link quality from the source node S to the destination node D is not previously stored in the local routing cache table of a destination node D (e.g., if a value of the second threshold (or alternatively, predetermined) link quality is null), then the destination node D may store a path S→1→2→D from the source node S to the destination node D into a forward routing table of the local routing table of the destination node D, and store a forward link quality of the path S→1→2→D from the source node S to the destination node D into the local routing cache table of the destination node D simultaneously or concurrently. Accordingly, the destination node D may store a path D→2→1→S from the destination node D to the source node S into a backward routing table of the local routing table of the destination node D, and store a backward link quality of the path S→1→2→D from the source node S to the destination node D into the local routing cache table of the destination node D simultaneously or concurrently.

After the destination node D receives the routing request information transmitted by the node 2, the destination node D may receive the routing request information transmitted by the node 4. At this time, the destination node D may compare a forward link quality of a path S→3→4→D from the source node S to the destination node D with the second threshold (or alternatively, predetermined) forward link quality stored in the local routing table of the destination node D. At this time, the second threshold (or alternatively, predetermined) forward link quality is a forward link quality of a path S→1→2→D from the source node S to the destination node D. Because a forward link quality (1+0.5+0.5) of a path S→3→4→D from the source node S to the destination node D is not better than a forward link quality (1+2+1) of a path S→1→2→D from the source node S to the destination node D, the destination node D may not update the forward link quality of the path S→1→2→D from the source node S to the destination node D stored in the local routing cache table, and the destination node D does not update the path S→1→2→D from the source node S to the destination node D in the local routing table.

Accordingly, the destination node D may compare a backward link quality of the path S→3→4→D from the source node S to the destination node D the second threshold (or alternatively, predetermined) backward link quality stored in the local routing table of the destination node D. At this time, the second threshold (or alternatively, predetermined) backward link quality is a backward link quality of the path S→1→2→D from the source node S to the destination node D. Because a backward link quality (0.3+0.7+2) of the path S→3→4→D from the source node S to the destination node D is better than a backward link quality (0.3+0.6+0.1) of the path S→1→2→D from the source node S to the destination node D, the destination node D may update the backward link quality of the path S→1→2→D from the source node S to the destination node D stored in the local routing table as the backward link quality of the path S→3→4→D from the source node S to the destination node D, and the destination node D may further updates a path D→2→1→S from the destination node D to the source node S in the local routing table as a path D→4→3→S from the destination node D to the source node S.

In a case where step S23 uses the distance vector routing mode, the local routing table to the source node of the destination node may include a next hop node of a path to the source node of the destination node, and the destination node may determine whether to update a local routing table to the source node of the destination node according to the sixth link quality.

For example, when the sixth link quality is better than the second threshold (or alternatively, predetermined) link quality stored in the local routing cache table of the destination node, the arbitrary neighbor node of the destination node may be taken as a next hop node of a path to the source node of the destination node, and may be added into the local routing table of the destination node so as to update the local routing table of the destination node.

As an example, the local routing table to the source node of the destination node may include a forward next hop node to the source node of the destination node. When the sixth backward link quality is better than the second threshold (or alternatively, predetermined) backward link quality stored in the local routing cache table of the destination node, the destination node may take the arbitrary neighbor node of the destination node as a forward next hop node to the source node of the destination node, and add the arbitrary neighbor node into the local routing table of the destination node so as to update the local routing table of the destination node. Here, the forward next hop node to the source node of the destination node may refer to a node transmitting the routing request information to the destination node on a path where the backward link quality from the source node to the destination node is desirable.

Accordingly, a local routing table to the source node of the destination node may further include a backward next hop node to the source node of the destination node. When the sixth forward link quality is better than the second threshold (or alternatively, predetermined) forward link quality stored in the local routing cache table of the destination node, the destination node may take the arbitrary neighbor node of the destination node as a forward next hop node to the source node of the destination node, and add the arbitrary neighbor node into the local routing table of the destination node so as to update the local routing table of the destination node. Here, a backward next hop node to the source node of the destination node may refer to a node transmitting the routing request information to the destination node on a path where the forward link quality from the source node to the destination node is desirable.

Hereinafter, a step for the destination node in the topology structure illustrated in FIG. 2 to update the local routing table in the distance vector routing mode is described in detail with reference to FIG. 12.

Figure 12:
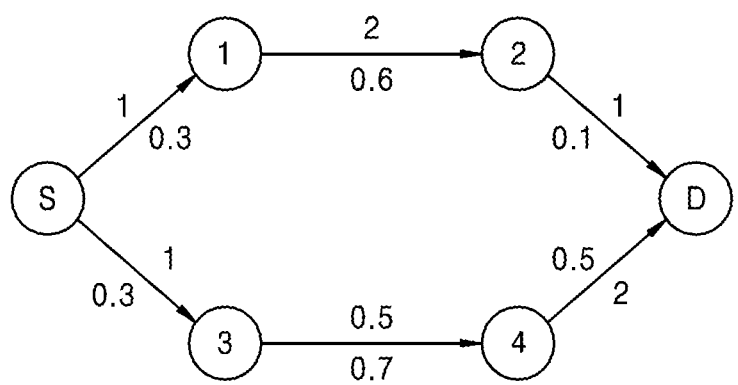
FIG. 12 illustrates an example diagram for a destination node in a topology structure illustrated in FIG. 2 to update a local routing table in a distance vector routing mode according to an example embodiment of the present disclosure.

FIG. 12 illustrates an example diagram for a destination node in a topology structure illustrated in FIG. 2 to update a local routing table in a distance vector routing mode according to an example embodiment of the present disclosure.

As shown in FIG. 12, a destination node D receives routing request information from a node 2, and may also receive another routing request information from a node 4. Assuming that the destination node D receives the routing request information transmitted by the node 2 first, if a link quality from a source node S to the destination node D is not previously stored in a local routing cache table of the destination node D (e.g., if a value of the second threshold (or alternatively, predetermined) link quality is null), then the destination node D may take a neighbor node (e.g., a node 2) of the destination node D as a forward next hop node to the source node S of the destination node D, add the neighbor node into a local routing table of the destination node D, and store a forward link quality of the path S→1→2→D from the source node S to the destination node D into a local routing cache table of the destination node D simultaneously or concurrently.

Accordingly, the destination node D may take a neighbor node (e.g., the node 2) of the destination node as a backward next hop node to the source node of the destination node D, add the neighbor node into the local routing table of the destination node D, and store a backward link quality of the path S→1→2→D from the source node S to the destination node D into the local routing cache table of the destination node D simultaneously or concurrently.

After the destination node D receives the routing request information transmitted by the node 2, the destination node D may receive the routing request information transmitted by the node 4. At this time, the destination node D may compare the forward link quality of the path S→3→4→D from the source node S to the destination node D with the second threshold (or alternatively, predetermined) forward link quality stored in the local routing table of the destination node D. At this time, the second threshold (or alternatively, predetermined) forward link quality may be the forward link quality of the path S→1→2→D from the source node S to the destination node D. Because a forward link quality (1+0.5+0.5) of the path S→3→4→D from the source node S to the destination node D is not better than a forward link quality (1+2+1) of the path S→1→2→D from the source node S to the destination node D, the destination node D may not update the second threshold (or alternatively, predetermined) forward link quality stored in the local routing cache table and the destination node D may not update the backward next hop node to the source node of the destination node in the local routing table.

Accordingly, the destination node D may compare the backward link quality of the path S→3→4→D from the source node S to the destination node D with the second threshold (or alternatively, predetermined) backward link quality stored in the local routing table of the destination node D. At this time, the second threshold (or alternatively, predetermined) backward link quality may be the backward link quality of the path S→1→2→D from the source node S to the destination node D. Because a backward link quality (0.3+0.7+2) of the path S→3→4→D from the source node S to the destination node D is better than a second threshold (or alternatively, predetermined) backward link quality (0.3+0.6+1), the destination node D updates the second threshold (or alternatively, predetermined) backward link quality stored in the local routing table as the backward link quality of the path S→3-4→D from the source node S to the destination node D, and the destination node D may further update a forward next hop node from the destination node D to the source node S in the local routing table as the forward next hop node 4 of the path D→4→3→S from the destination node D to the source node S. FIG. 12 illustrates the local routing table acquired after updating the destination node D.

Accordingly, the destination node may determine a desirable forward path and/or a desirable backward path from the source node to the destination node according to the link quality of the path from the source node to the destination node.

Some methods of selecting the routing in the asymmetric link according to some example embodiments of the present disclosure may be performed as follow. For example, the destination node may transmit reply information to the source node through a backward path of the desirable backward path and/or the desirable forward path so that the source node may transmit data to the destination node based on the reply information.

In the case where step 23 uses the source routing mode, the reply information may include the desirable forward path and/or the desirable backward path from the source node to the destination node so that the source node may transmit data to the destination node through a forward path of the desirable forward path and/or the desirable backward path.

In one case, the destination node may transmit the reply information carrying the desirable forward path and/or the desirable backward path from the source node to the destination node to the source node through the desirable backward path. In an example embodiment of the present disclosure, the reply information may be transmitted to the source node, for example, through the desirable backward path. Here, the desirable backward path may be a desirable path for transmitting data from destination node to the source node, and by transmitting the reply information along the path, the stability and rapidity of data transmission from the destination node to the source node may be improved.

In another case, the destination node may transmit the reply information carrying the desirable forward path and/or the desirable backward path from the source node to the destination node to the source node through the backward path of the desirable forward path. For example, when the backward link quality of the desirable forward path is better (e.g., if the backward link quality of the desirable forward path is not lower than a link quality threshold), the destination node may transmit the reply information to the source node through the backward path of the desirable forward path.

In another case, the destination node may transmit the reply information, which carries the desirable forward path and/or the desirable backward path from the source node to the destination node, to the source node through the desirable forward path and the desirable backward path simultaneously or concurrently so as to improve the stability of the data transmission from the destination node to the source node.

In an asymmetric link of an example embodiment of the present disclosure, in the source routing mode, after receiving the reply message, the source node S may parse the reply message, the source node S may acquire the desirable forward path and/or the desirable backward path. The source node S may transmit the data to the destination node D through the desirable forward path. But if the desirable forward path is blocked, a routing maintenance stage may be entered. In such a stage, the source node S can transmit blocked data to the destination node D through the forward path of the desirable backward path. For example, assuming that the desirable backward path is D→4→3→S, then the forward path of the desirable backward path is S→3→4→D, and the source node S may re-transmit a routing request only when both the forward path of the desirable forward path and the desirable backward path are blocked.

In the case where step S23 uses the distance vector routing mode, the reply information may include the forward reply information. In this case, the method for selecting the routing in the asymmetric link according to an example embodiment of the present disclosure may be performed as follows. The destination node may transmit the forward reply information to the backward next hop node to the source node of the destination node stored in the local routing table of the destination node for the source node to determine the forward next hop node from the source node to the destination node according to the forward reply information, so that the source node may transmit the data to the destination node through the forward next hop node from the source node to the destination node.

In another example, the reply information may further include the backward reply information. In this case, the destination node may transmit the backward reply information, which includes information on the desirable forward path from the source node to the destination node, to the forward next hop node to the source node of the destination node stored in the local routing table of the destination node so that the source node may transmit the data to the destination node according to the backward reply information.

Hereinafter, a process for the destination node to transmit the forward reply information to the backward next hop node to the source node of the destination node stored in the local routing table of the destination node, and for the destination node to transmit the backward reply information to the forward next hop node to the source node of the destination node stored in the local routing table of the destination node will be described in detail in combination with FIGS. 13-18.

Figure 13:
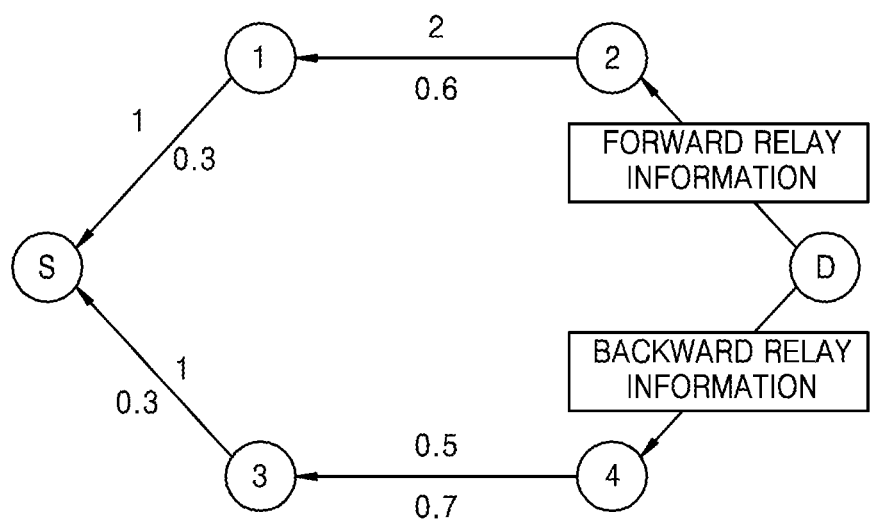
FIG. 13 illustrates an example diagram for a destination node to transmit forward reply information to a backward next hop node to a source node of the destination node stored in a local routing table of the destination node, and for the destination node to transmit backward reply information to a forward next hop node to the source node of the destination node stored in the local routing table of the destination node, according to an example embodiment of the present disclosure.

FIG. 13 illustrates an example diagram for a destination node to transmit forward reply information to a backward next hop node to a source node of the destination node stored in a local routing table of the destination node, and for the destination node to transmit backward reply information to a forward next hop node to the source node of the destination node stored in the local routing table of the destination node, according to an example embodiment of the present disclosure.

In this case, the arbitrary intermediate node may not only have the local routing table to the source node, but also have the local routing table to the destination node. The local routing table to the destination node of the arbitrary intermediate node may only include the forward next hop node to the destination node of the arbitrary intermediate node. Thus, the local routing table to the destination node of the arbitrary intermediate node may not include all nodes on a path from the arbitrary intermediate node to the destination node.

For example, a step for the arbitrary intermediate node to update the local routing table to the destination node of the arbitrary intermediate node according to forward reply information received from a previous hop node in a direction from the destination node to the source node may be performed as follows. After the arbitrary intermediate node receives the forward reply information from the previous hop node in the direction from the destination node to the source node, the previous hop node of the arbitrary intermediate node may be taken as a forward next hop node to the destination node of the arbitrary intermediate node and may be added into the local routing table to the destination node of the arbitrary intermediate node so as to update the local routing table to the destination node of the arbitrary intermediate node, and forward the forward reply information to the forward next hop node to the source node of the arbitrary intermediate node stored in the local routing table to the source node of the arbitrary intermediate node. The previous hop node mentioned herein may refer to a node for transmitting the forward reply information to a node for receiving the forward reply information. The forward reply information may include a forward identifier. The node which has received the forward reply information may update the forward next hop node to the destination node in the local routing table of this node according to the forward identifier.

Figure 14:
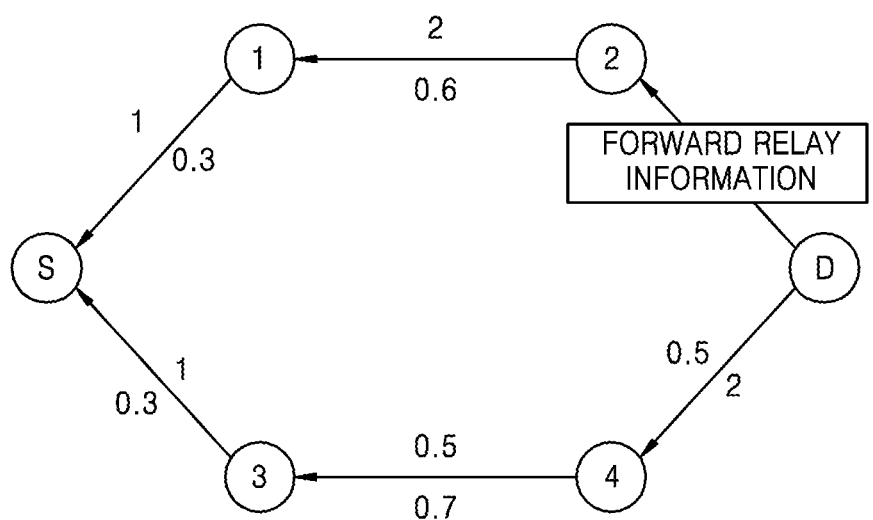
FIG. 14 illustrates an example diagram for a node 2 in a topology structure illustrated in FIG. 2 to update a local routing table to a destination node D of the node 2 in accordance with the forward reply information received from the destination node D according to an example embodiment of the present disclosure.

FIG. 14 illustrates an example diagram for a node 2 in a topology structure illustrated in FIG. 2 to update a local routing table to a destination node D of the node 2 in accordance with the forward reply information received from the destination node D according to an example embodiment of the present disclosure.

As shown in FIG. 14, after the node 2 receives the forward reply information transmitted by the destination node D, the node 2 may take a previous hop node (e.g., the destination node D) of the node 2 as the forward next hop node to the destination node of the node 2, and add the previous hop node into the local routing table to the destination node of the node 2 so as to update the local routing table to the destination node of the node 2. Here, the forward reply information is transmitted back to the node 2 by the destination node D along a backward path of the desirable forward path from the source node to the destination node. Thus, the node 2 knows that the forward next hop node to the destination node D of the node 2 is the destination node D. At this time, the node 2 does not know which node is the backward next hop node to the destination node D of the node 2. Thus, backward next hop node to the destination node D of the node 2 is not provided.

Figure 15:
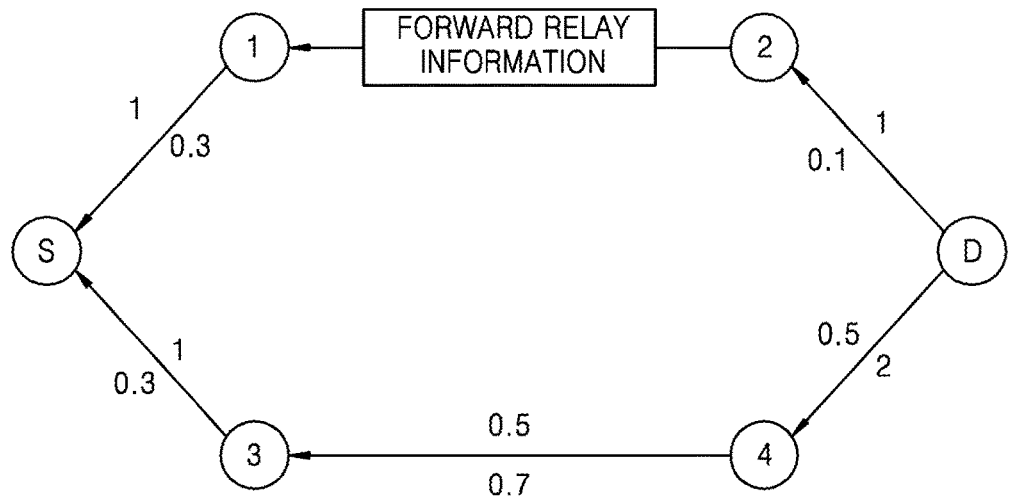
FIG. 15 illustrates an example diagram for a node 1 in a topology structure illustrated in FIG. 2 to update a local routing table to a destination node of the node 1 in accordance with the forward reply information received from a node 2 according to an example embodiment of the present disclosure.

FIG. 15 illustrates an example diagram for a node 1 in a topology structure illustrated in FIG. 2 to update a local routing table to a destination node of the node 1 in accordance with the forward reply information received from a node 2 according to an example embodiment of the present disclosure.

As shown in FIG. 15, after the node 1 receives the forward reply information transmitted by the node 2, the node 1 may take a previous hop node (e.g., the node 2) of the node 1 as the forward next hop node to the destination node of the node 1, and add the previous hop node into the local routing table to the destination node D of the node 1 so as to update the local routing table to the destination node of the node 1. Here, the forward reply information may be transmitted back to the node 1 by the node 2 along the backward path of the desirable forward path from the source node to the destination node. Thus, the node 1 knows that the forward next hop node to the destination node D of the node 1 is the node 2. At this time, the node 1 does not know which node is the backward next hop node to the destination node D of the node 1. Thus, the backward next hop node to the destination node D of the node 1 is not provided.

Accordingly, the source node may also have a local routing table. The local routing table of the source node may only include the forward next hop node to the destination node of the source node. Thus, the local routing table of the source node may not include all nodes on a path from the source node to the destination node.

For example, a step for the source node to update the local routing table of the source node according to the forward reply information received from the previous hop node in the direction from the destination node to the source node may be performed as follow. After the source node receives the forward reply information from the previous hop node in the direction from the destination node to the source node, the previous hop node thereof may be taken as the forward next hop node to the destination node of the source node and may be added into the local routing table of the source node so as to update the local routing table of the source node.

Figure 16:
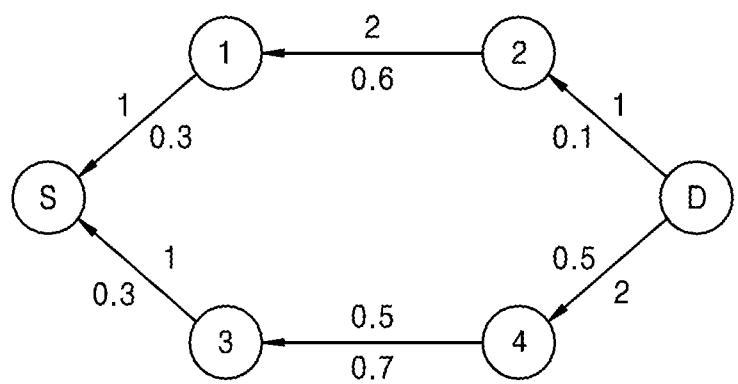
FIG. 16 illustrates an example diagram for a source node S in a topology structure illustrated in FIG. 2 to update a local routing table to a destination node of the source node S in accordance with forward reply information received from a node 1 and in accordance with backward reply information received from a node 3, according to an example embodiment of the present disclosure.

FIG. 16 illustrates an example diagram for a source node S in a topology structure illustrated in FIG. 2 to update a local routing table to a destination node of the source node S in accordance with forward reply information received from a node 1 and in accordance with backward reply information received from a node 3, according to an example embodiment of the present disclosure.

As shown in FIG. 16, after the source node S receives the forward reply information from the node 1, the source node S may take the previous hop node (e.g., the node 1) of the source node S as the forward next hop node to the destination node D of the source node S, and add the previous hop node into the local routing table to the destination node D of the source node S so as to update the local routing table to the destination node D of the source node S.

Hereinafter, a process for the destination node to transmit the backward reply information to the forward next hop node to the source node of the destination node stored in the local routing table of the destination node is described.

In this case, the local routing table to the source node of the arbitrary intermediate node may also include the forward next hop node to the source node of the arbitrary intermediate node.

For example, a step for the arbitrary intermediate node to update the local routing table to the destination node of the arbitrary intermediate node according to the backward reply information received from the previous hop node may be performed as follows. After the arbitrary intermediate node receives the backward reply information from the previous hop node in the direction from the destination node to the source node, the previous hop node of the arbitrary intermediate node may be taken as the backward next hop node to the destination node of the arbitrary intermediate node, and may be added into the local routing table to the destination node of the arbitrary intermediate node so as to update the local routing table to the destination node of the arbitrary intermediate node, and forward the backward reply information to the forward next hop node to the source node of the arbitrary intermediate node stored in the local routing table to the source node of the arbitrary intermediate node. The previous hop node mentioned herein may refer to the node for transmitting the backward reply information to the node for receiving the backward reply information. The backward reply information may include a backward identifier. The node which has received the backward reply information may update the backward next hop node to the destination node in the local routing table of this node according to the backward identifier.

Figure 17:
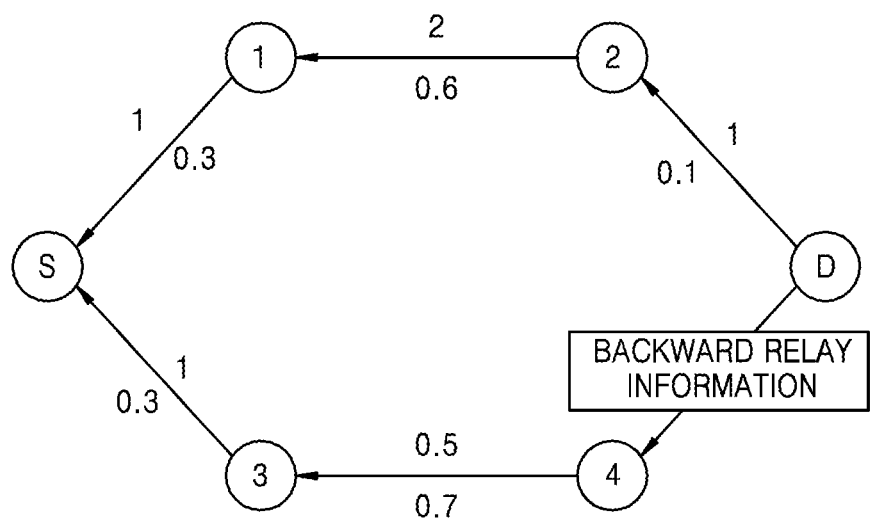
FIG. 17 illustrates an example diagram for a node 4 in a topology structure illustrated in FIG. 2 to update a local routing table to a destination node D of the node 4 in accordance with backward reply information received from the destination node D, according to an example embodiment of the present disclosure.

FIG. 17 illustrates an example diagram for a node 4 in a topology structure illustrated in FIG. 2 to update a local routing table to a destination node D of the node 4 in accordance with backward reply information received from the destination node D, according to an example embodiment of the present disclosure.

As shown in FIG. 17, after the node 4 receives the backward reply information transmitted by the destination node D, the node 4 may take a previous hop node (e.g., the destination node D) of the node 4 as the backward next hop node to the destination node of the node 4, and add the previous hop node into the local routing table to the destination node D of the node 4 so as to update the local routing table to the destination node of the node 4.

Figure 18:
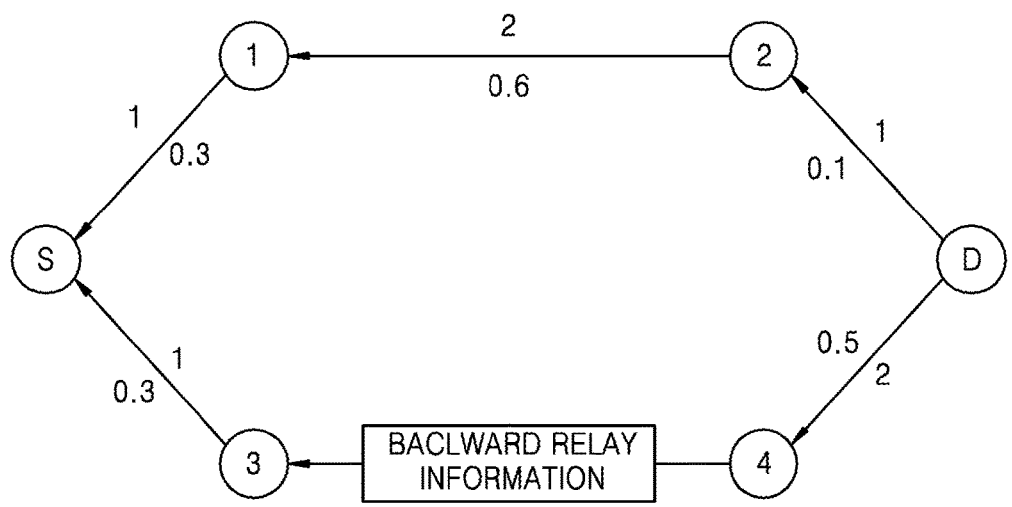
FIG. 18 illustrates an example diagram for a node 3 in a topology structure illustrated in FIG. 2 to update a local routing table to a destination node of the node 3 in accordance with backward reply information received from a node 4, according to an exemplary embodiment of the present disclosure.

Similarly, FIG. 18 illustrates an example diagram for a node 3 in a topology structure illustrated in FIG. 2 to update a local routing table to a destination node of the node 3 in accordance with backward reply information received from a node 4, according to an example embodiment of the present disclosure.

As shown in FIG. 18, after the node 3 receives the backward reply information transmitted by the node 4, the node 3 may take the previous hop node (e.g., the node 4) of the node 3 as the backward next hop node to the destination node D of the node 3, and add the previous hop node into the local routing table to the destination node D of the node 3 so as to update the local routing table to the destination node of the node 3.

The local routing table of the source node may further include the backward next hop node to the destination node of the source node.

For example, a step for the source node to update the local routing table of the source node according to the backward reply information received from the previous hop node may be performed as follows. After the source node receives the backward reply information from the previous hop node in the direction from the destination node to the source node, the previous hop node of the source node may be taken as the backward next hop node to the destination node of the source node and may be added into the local routing table of the source node so as to update the local routing table of the source node.

As shown in FIG. 16, after the source node S receives the backward reply information from the node 3, the source node S may take the previous hop node (e.g., the node 3) of the source node S as the backward next hop node to the destination node D of the source node S, and add the previous hop node into the local routing table to the destination node D of the source node S so as to update the local routing table to the destination node of the source node S.

A time for the source node to receive the forward reply information and a time for the source node to receive the backward reply information may be different in sequence. When the time for the source node to receive the forward reply information is earlier than the time for the source node to receive the backward reply information, the forward next hop node from the source node to the destination node has already been established in the local routing table of each node on the path from the source node to the destination node. Thus, the source node can transmit data to the destination node based on the local routing table of each node on the path from the source node to the destination node.

When the time for the source node to receive the backward reply information is earlier than the time for the source node to receive the forward reply information, the source node determines whether the source node transmits data to the backward next hop node from the source node to the destination node in the routing table of the source node according to relevant information of the desirable forward path from the source node to the destination node included in the backward reply information.

As an example, the relevant information of the desirable forward path from the source node to the destination node may include the backward link quality of a desirable forward path and the forward link quality of a desirable backward path. Here, the backward link quality of the desirable forward path may be a ratio between the backward link quality of the desirable forward path and the link quality of the desirable backward path. The forward link quality of the desirable backward path may be an ratio between the forward link quality of the desirable backward path and the link quality of the desirable forward path.

Hereinafter, a step for the source node to process the received forward reply information and backward reply information in the distance vector routing mode will be described in detail with reference to FIG. 19.

Figure 19:
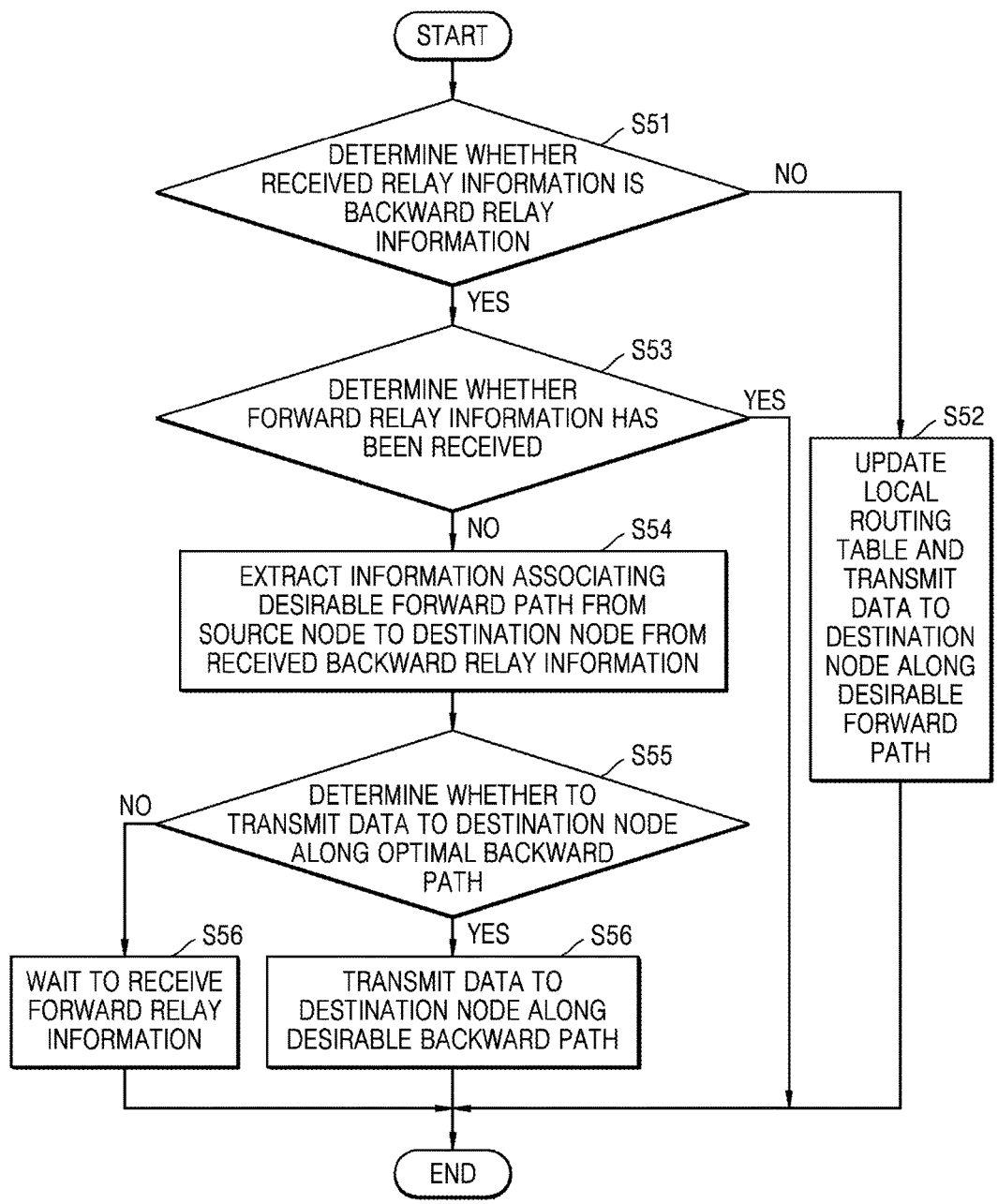
FIG. 19 illustrates a flowchart illustrating a step for a source node to process received forward reply information and backward reply information according to an exemplary embodiment of the present disclosure.

FIG. 19 illustrates a flowchart illustrating a step for a source node to process received forward reply information and backward reply information according to an example embodiment of the present disclosure.

Referring to FIG. 19, in step S51, the source node determines a type of the received reply information. In other words, whether the type of the reply information received by the source node is the backward reply information may be determined (step S51). Here, the type of the reply information may include the forward reply information and the backward reply information.

If the source node determines that the type of the received reply information is not the backward reply information (e.g., if the type of the reply information received by the source node is the forward reply information), then step S52 is executed. For example, a source node may take the previous hop node thereof as the forward next hop node to the destination node of the source node and may be added into the local routing table of the source node so as to update the local routing table of the source node and transmits data to the forward next hop node to the destination node of the source node in the local routing table of the source node.

If the source node determines that the type of the received reply information is the backward reply information, then step S53 is executed to determine whether the source node has received the forward reply information. For example, whether the source node has received the forward reply information within a set time may be detected.

If the source node has received the forward reply information, then the source node may neglect the backward reply information, and continue to transmit data to the forward next hop node to the destination node of the source node in the local routing table of the source node.

If the source node has not received the forward reply information, then step S54 is executed to extract relevant information of the desirable forward path from the source node to the destination node from the received backward reply information. At this time, the backward link quality of the desirable forward path and the forward link quality of the desirable backward path may be acquired.

In step S55, whether the source node transmits data to the backward next hop node to the destination node of the source node in the routing table of the source node may be determined.

Alternately, a step of determining whether the source node transmits data to the backward next hop node from the source node to the destination node in the routing table of the source node may be performed as follows. The backward link quality of the desirable forward path may be compared with the forward link quality of the desirable backward path to determine whether the forward link quality of the desirable backward path is better than the backward link quality of the desirable forward path.

If the forward link quality of the desirable backward path is better than the backward link quality of the desirable forward path, then step S56 is executed. Thus, a source node may transmit data to the backward next hop node from the source node to the destination node in the routing table of the source node.

Hereinafter, a step for the source node to transmit data to the destination node in the case where the forward link quality of the desirable backward path is better than the backward link quality of the desirable forward path is described in detail with reference to FIG. 20.

Figure 20:
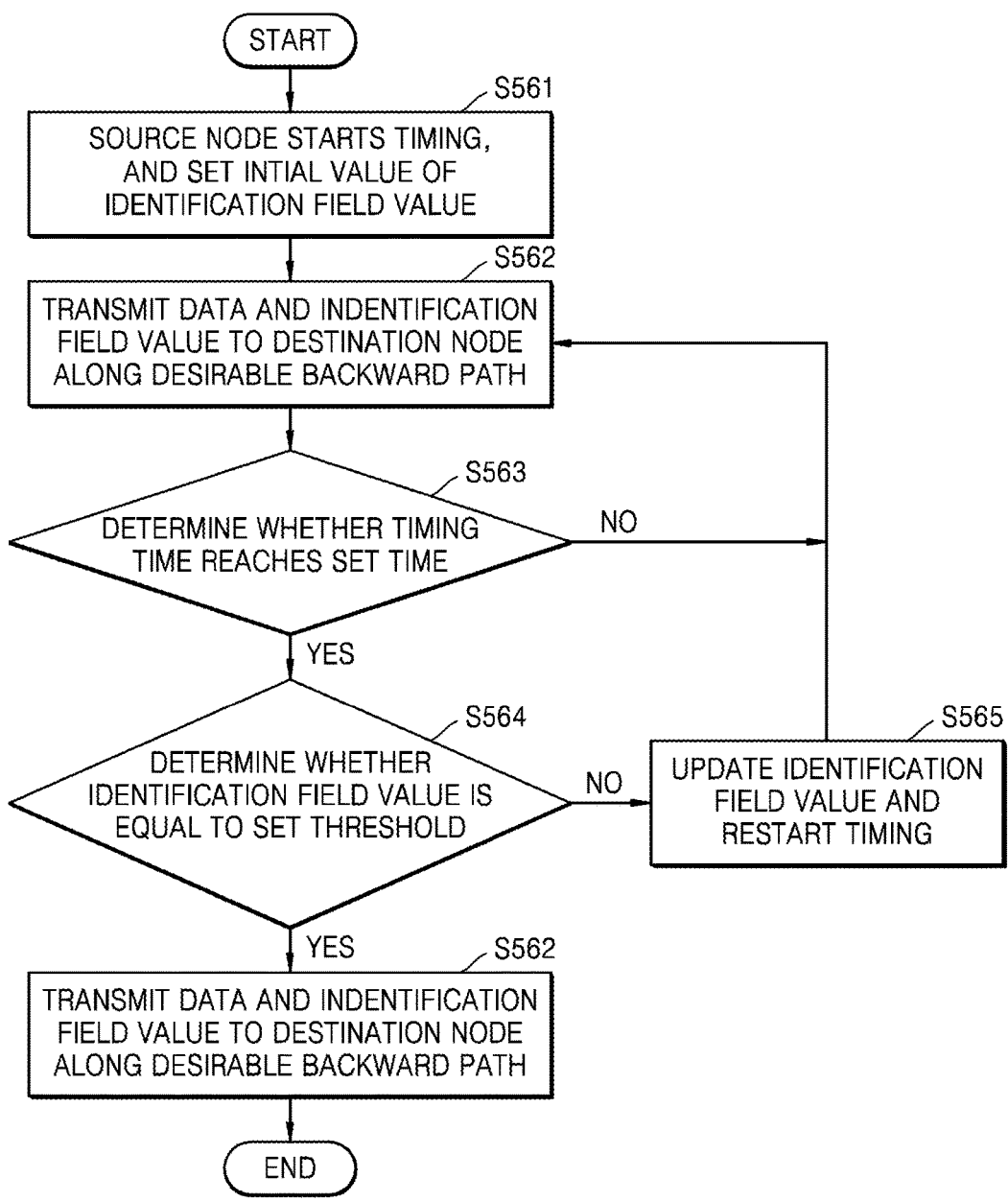
FIG. 20 illustrates a flowchart illustrating a step for a source node to transmit data to a destination node according to an example embodiment of the present disclosure.

FIG. 20 illustrates a flowchart illustrating a step for a source node to transmit data to a destination node according to an example embodiment of the present disclosure.

Referring to FIG. 20, in step S561, the source node may start a timing, and set an initial value of an identification field value as 1.

As an example, the source node may include a timer. When the forward link quality of the desirable backward path is better than the backward link quality of the desirable forward path, the timer in the source node may be initiated to start the timing.

In step S562, the source node may transmit data and an identification field value to the next hop node of the desirable backward path from the source node to the destination node in the routing table of the source node.

In step S563, whether a timing time reaches the set time (e.g., a threshold time) is determined. For example, whether the timing time of the timer in the source node has reached the set time may be determined.

If the timing time does not reach the set time, step S562 re-iterated, and the source node continues to transmit the data and the identification field value to the backward next hop node from the source node to the destination node in the routing table of the source node.

If the timing time reaches the set time, then step S564 is executed to determine whether the identification field value equals to a set threshold value.

If the identification field value is not equal to the set threshold value, then step S565 is executed to update the identification field value (e.g., adding 1 to the identification field value, and then assigning it to the identification field value), the timing is restarted, and step S562 re-iterated.

If the identification field value equals to the set threshold value, then step S566 is executed for the source node to transmit the data and the identification field value to the backward next hop node from the source node to the destination node in the routing table of the source node. Here, the identification field value may be used to record a number of times for the timing time to reach the set time. When the number of times for the timing time to reach the set time reaches the set threshold value, it indicates that the source node has not received the forward reply information for a period of time (the period of time=set time×number of times), and the forward reply information has been probably lost. At this time, for example, the source node may notify the destination node to re-transmit the forward reply information.

Hereinafter, a step for the destination node to determine whether to re-transmit the forward reply information to the source node will be described in detail with reference to FIG. 21.

Figure 21:
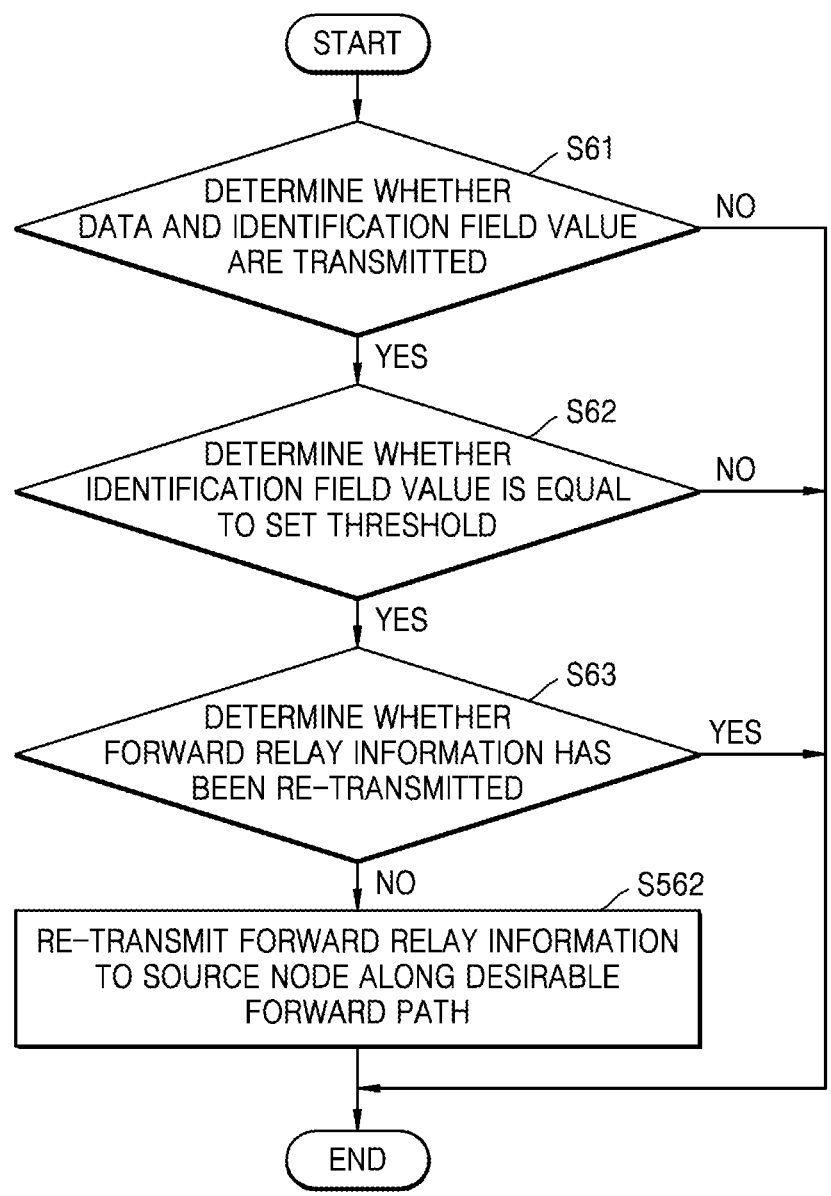
FIG. 21 illustrates a flowchart illustrating a step for a destination node to determine whether to re-transmit forward reply information to a source node according to an example embodiment of the present disclosure.

FIG. 21 illustrates a flowchart illustrating a step for a destination node to determine whether to re-transmit forward reply information to a source node according to an example embodiment of the present disclosure.

Referring to FIG. 21, in step S61, the destination node determines whether the data and the identification field value are transmitted together. The identification field value may also be carried in the data. The data and the identification field value may be independent from each other, and may be transmitted from the source node to the destination node together. However, the present disclosure is not limited thereto, the data and the identification field value may be transmitted together in various manners.

If the data and the identification field value are not transmitted together, the destination node may not re-transmit the forward reply information to the source node.

If the data and the identification field value are transmitted together, then step S62 is executed to determine whether the identification field value equals to the set threshold value.

If the identification field value does not equal to the set threshold value, then the destination node may not re-transmit the forward reply information to the source node.

If the identification field value equals to the set threshold value, then step S63 is executed to determine whether the destination node has re-transmitted the forward reply information to the backward next hop node to the source node of the destination node stored in the local routing table of the destination node.

If the destination node has not re-transmitted the forward reply information to the backward next hop node to the source node of the destination node stored in the local routing table of the destination node, then step S64 is executed for the destination node to re-transmit the forward reply information to the backward next hop node to the source node of the destination node stored in the local routing table of the destination node.

If the destination node has re-transmitted the forward reply information to the backward next hop node to the source node of the destination node stored in the local routing table of the destination node, the destination node may not re-transmit the forward reply information to the source node.

Returning to FIG. 19, if the forward link quality of the desirable backward path is not better than the backward link quality of the desirable forward path, then step S57 is executed. In step S57, the source node does not transmit data to the backward next hop node from the source node to the destination node in the routing table of the source node, and waits to receive the forward reply information.

As an example, the source node can estimate a wait time for the source node waiting to receive the forward reply information based on the backward link quality of the desirable forward path. For example, after determining the backward link quality of the desirable forward path, the source node may estimate a time of transmitting the forward reply information from the destination node to the source node, and with reference to the time of transmitting the forward reply information from the destination node to the source node, those skilled in the art may estimate the wait time for the source node waiting to receive the forward reply information based on experience.

In the distance vector routing mode, each node on the path from the source node to the destination node may maintain their respective the local routing tables to the destination node and/or the local routing tables to the source node. Thus, when one of the forward paths corresponding to the desirable forward path or the desirable backward path is broken, the source node may use another path to continue the data transmission to the destination node.

Figure 22:
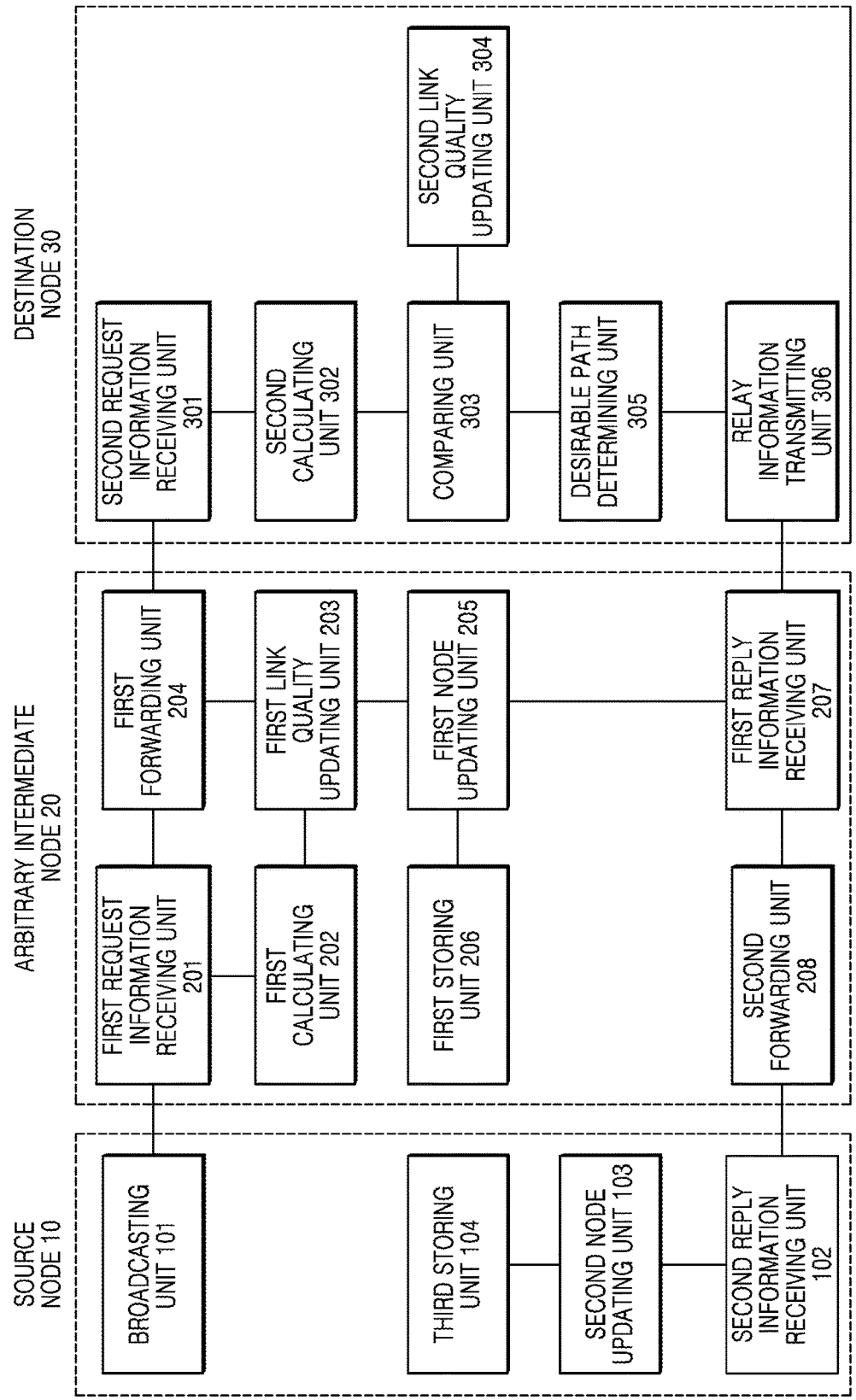
FIG. 22 illustrates a block diagram of an apparatus of selecting a routing in an asymmetric link according to an example embodiment of the present disclosure.

FIG. 22 illustrates a block diagram of an apparatus of selecting a routing in an asymmetric link according to an example embodiment of the present disclosure. The asymmetric link can indicate that the forward link quality and the backward link quality between arbitrary neighbor second hop nodes on the path from the source node to the destination node are different. Here, in an example embodiment of the present disclosure, an asymmetric link may include a source node, a node network and a destination node, and the node network may include at least one intermediate node. The at least one intermediate node may form the node network by means of a series connection, a parallel connection or a cross connection, and the present disclosure does not limit the connection method between the respective intermediate nodes in the node network.

As shown in FIG. 22, a source node 10 of the asymmetric link according to the example embodiment of the present disclosure can include a broadcasting unit 101, a third storing unit 104 and a detecting unit (not shown).

For example, the broadcasting unit 101 may broadcast the routing request information.

The third storing unit 104 may be used for storing the local routing table of the source node, and the local routing table of the source node may store the desirable forward path from the source node to the destination node, or the forward next hop node on the path to the destination node of the source node.

For example, before the broadcasting unit 101 broadcasts the routing request information, the detecting unit may detect whether the local routing table of the source node stores the desirable forward path from the source node to the destination node, or the forward next hop node on the path to the destination node of the source node. If the local routing table of the source node stores any one of the desirable forward path from the source node to the destination node, and the forward next hop node on the path to the destination node of the source node, then data may be transmitted to the destination node through the desirable forward path stored in the local routing table of the source node, or may be transmitted to the forward next hop node on the path to the destination node. If the local routing table of the source node does not store the desirable forward path from the source node to the destination node, and the forward next hop node on the path to the destination node of the source node, then the broadcasting unit 101 may broadcast the routing request information.

As an example, a format of the routing request information according to an example embodiment of the present disclosure can be shown in the Table 3 below:

TABLE 3

| Routing Type | Routing Table | Link Quality |
|---|---|---|
| Forward | | |
| Backward | | |

As shown in Table 3, the routing request information may include the routing type, the routing table and the link quality. The routing type may include the forward type and the backward type in a process of transmitting the routing request information from the source node to the destination node. The respective node on the path from the source node to the destination node may update the routing table and/or the link quality in the routing request information. The format of the routing request information as shown in Table 3 only lists the part that needs to be added in an example embodiment of the present disclosure. Thus, Table 3 is not a complete list of contents included in the routing request information. For example, Table 3 does not completely list the content such as the source node, the destination node, a sequence number and etc. included in the existing routing request information. Further, the format of the routing request information shown in Table 3 is only an example, and the routing request information may only include the routing type and the link quality only, without including the routing table, and those skilled in the art may adjust the contents included in the routing request information according to desired.

In an example embodiment of the present disclosure, the broadcast routing request information may be transmitted to the destination node via the node network. For example, the node network may receive the routing request information, update the routing request information, and transmits the updated routing request information to the destination node. Here, as an example, an arbitrary intermediate node 20 in the arbitrary intermediate node included in the node network of the asymmetric link according to the example embodiment of the present disclosure may include a first request information receiving unit 201, a first calculating unit 202, a first link quality updating unit 203, a first forwarding unit 204, a first node updating unit 205, the first storing unit 206, a first reply information receiving unit 207, and a second forwarding unit 208.

For example, the first request information receiving unit 201 may receive the routing request information from an arbitrary neighbor node of the arbitrary intermediate node. Here, the routing request information received by the first request information receiving unit 201 may include the first link quality. For example, the first link quality may indicate a link quality of the path from the source node to the arbitrary neighbor node.

The arbitrary neighbor node of the arbitrary intermediate node may be the source node, or other intermediate node transmitting the routing request information to the arbitrary intermediate node than the arbitrary intermediate node in the node network.

The first calculating unit 202 may acquire the third link quality according to the acquired second link quality and the first link quality included in the routing request information received by the first request information receiving unit 201. Here, the second link quality may indicate the link quality of the path between the arbitrary intermediate node and the arbitrary neighbor node, and the third link quality may indicate the link quality of the path from the source node to the arbitrary intermediate node.

For example, the first calculating unit 202 may extract the first link quality from the received routing request information, and may add the acquired second link quality with the extracted first link quality to acquire the third link quality. Here, the link quality of the path from the source node to the arbitrary intermediate node may be acquired through various existing methods. In the example embodiment of the present disclosure, a step of acquiring the link quality of the path from the source node to the arbitrary intermediate node by summating the link qualities between all the neighbor second hop nodes on the path from the source node to the arbitrary intermediate node is only an example, the present disclosure is not limited thereto, and the link quality of the path may also be acquired through multiplying or other methods.

In some example embodiments, the arbitrary intermediate node may further include a link quality acquiring unit (not shown) for acquiring the second link quality. Here, the link quality between the arbitrary neighbor second hop nodes may be acquired through various existing devices. As an example, the link quality between the arbitrary neighbor second hop nodes may be obtained by interacting or transmitting a Hello message between the arbitrary neighbor second hop nodes.

Here, a function of the link quality acquiring unit for acquiring the link quality between the arbitrary neighbor second nodes has been described in detail in FIG. 4, so this is not repeated in the present disclosure.

The first link quality updating unit 203 may update the first link quality in the routing request information with the third link quality.

For example, the first link quality updating unit 203 may compare the third link quality with the first threshold (or alternatively, predetermined) link quality (e.g., determining whether the third link quality is better than the first threshold (or alternatively, predetermined) link quality). When the third link quality is better than the first threshold (or alternatively, predetermined) link quality, the first link quality in the routing request information may be updated with the third link quality. Here, the first threshold (or alternatively, predetermined) link quality may indicate the link quality of the path from the source node to the arbitrary intermediate node stored in the arbitrary intermediate node.

For example, the arbitrary intermediate node according to the example embodiment of the present disclosure may further include the sixth storing unit (not shown) for storing the local routing cache table of the arbitrary intermediate node. The first threshold (or alternatively, predetermined) link quality may be stored in the local routing cache table of the arbitrary intermediate node. When the third link quality is better than the first threshold (or alternatively, predetermined) link quality, the first link quality updating unit 203 may further write the third link quality into the local routing cache table of the arbitrary intermediate node, and update the first threshold (or alternatively, predetermined) link quality in the local routing cache table of the arbitrary intermediate node with the third link quality.

When the third link quality is not better than the first threshold (or alternatively, predetermined) link quality, the first link quality updating unit 203 does not update the first link quality in the routing request information. Accordingly, the first forwarding unit 204 does not forward the routing request information (e.g., the routing request information is not broadcast to neighbor node(s) other than the arbitrary neighbor node of the arbitrary intermediate node), and the routing request information is discarded. At this time, the first link quality updating unit 203 may not update the first threshold (or alternatively, predetermined) link quality in the local routing cache table of the arbitrary intermediate node.

In some example embodiments, the first link quality may include the first forward link quality, the third link quality may include the third forward link quality, and the first threshold (or alternatively, predetermined) link quality may include the first threshold (or alternatively, predetermined) forward link quality. In this case, the first link quality updating unit 203 may compare the third forward link quality with the first threshold (or alternatively, predetermined) forward link quality. When the third forward link quality is better than the first threshold (or alternatively, predetermined) forward link quality, the first forward link quality in the routing request information may be updated with the third forward link quality. Accordingly, the first threshold (or alternatively, predetermined) forward link quality in the local routing cache table of the arbitrary intermediate node may also be updated with the third forward link quality. When the third forward link quality is not better than the first threshold (or alternatively, predetermined) forward link quality, the first link quality updating unit 203 may not update the first forward link quality in the routing request information, and may not update the first threshold (or alternatively, predetermined) forward link quality in the local routing cache table of the arbitrary intermediate node.

Accordingly, the first link quality may further include the first backward link quality, the third link quality may further include the third backward link quality, and the first threshold (or alternatively, predetermined) link quality may further include the first threshold (or alternatively, predetermined) backward link quality. In this case, the first link quality updating unit 203 may compare the third backward link quality with the first threshold (or alternatively, predetermined) backward link quality. When the third backward link quality is better than the first threshold (or alternatively, predetermined) backward link quality, the first backward link quality in the routing request information may be updated with the third backward link quality. Accordingly, the first threshold (or alternatively, predetermined) backward link quality in the local routing cache table of the arbitrary intermediate node may be updated with the third backward link quality. When the third backward link quality is not better than the first threshold (or alternatively, predetermined) backward link quality, the first link quality updating unit 203 may not update the first backward link quality in the routing request information, and may not update the first threshold (or alternatively, predetermined) backward link quality in the local routing cache table of the arbitrary intermediate node.

As an example, the first link quality updating unit 203 may directly replace the first link quality in the routing request information with the third link quality, and update the first link quality in the routing request information. In this case, the routing request may include a sum of link qualities between all neighbor second hop nodes on the path from the source node to the arbitrary intermediate node. At this time, the first link quality updating unit 203 may update the sum of link qualities between all neighbor second hop nodes on the path from the source node to the arbitrary intermediate node in the routing request information.

Further, the first link quality updating unit 203 may also put the second link quality independently into the routing request information, and update the first link quality in the routing request information. At this time, the routing request may include independent link qualities between all neighbor second hop nodes on the path from the source node to the arbitrary intermediate node.

For example, the first link quality updating unit 203 may also combine the above two methods for updating the first link quality in the routing request information. For example, the arbitrary intermediate node may put the second link quality independently into the routing request information, and use the third link quality to update the sum of link qualities between all neighbor second hop nodes on the path from the source node to the arbitrary intermediate node in the routing request information.

Here, the asymmetric link may include the source routing mode and the distance vector routing mode. In the source routing mode, the source node knows each intermediate node passing to the destination node. In the distance vector routing mode, the source node does not know each intermediate node passing to the destination node and the respective node only knows the next hop node to the destination node. With respect to the characteristics of the above two routing modes, the methods for the first link quality updating unit 203 to update the routing request information may be different.

In an example embodiment of the first link quality updating unit 203, which uses the source routing mode, the routing request information may include the routing type, the routing table and the link quality (as shown in Table 3). At this time, as an example, the routing table may be used to record all nodes on a path from the source node to a neighbor node (for example, the arbitrary neighbor node of the arbitrary intermediate node) of a node receiving the routing request information. The neighbor node in an example embodiment of the present disclosure may refer to a node transmitting the routing request information to a node receiving the routing request information.

In this case, when the third link quality is better than the first threshold (or alternatively, predetermined) link quality, the first link quality updating unit 203 may not only update the first link quality in the routing request information with the third link quality, but also add the arbitrary intermediate node into the routing table to update the routing request information. At this time, the path from the source node to the arbitrary intermediate node may be obtained. When the third link quality is not better than the first threshold (or alternatively, predetermined) link quality, the first link quality updating unit 203 may not update routing table.

In some example embodiments, the routing table in the routing request information may include the forward routing table. When the third forward link quality is better than the first predetermined forward link quality, the first link quality updating unit 203 may add the arbitrary intermediate node into the forward routing table. When the third forward link quality is not better than the first threshold (or alternatively, predetermined) forward link quality, the first link quality updating unit 203 may not update the forward routing table.

The routing table in the routing request information may further include the backward routing table. When the third backward link quality is better than the first threshold (or alternatively, predetermined) backward link quality, the first link quality updating unit 203 may add the arbitrary intermediate node into the backward routing table. When the third backward link quality is not better than the first threshold (or alternatively, predetermined) backward link quality, the first link quality updating unit 203 may not update the backward routing table.

In an example embodiment of the first link quality updating unit 203, which uses the distance vector routing mode, the arbitrary intermediate node may only know the next hop node to the destination node, and may not know each intermediate node passing from the source node to the destination node. Thus, the routing request information in the distance vector routing mode may only include the routing type and the link quality, and may not include the path from the source node to the arbitrary intermediate node (namely not including the routing table in Table 3). In this way, an information transmission amount between the respective nodes may be effectively reduced.

For example, in the distance vector routing mode, the first storing unit 206 may be used for storing the local routing table to the source node of the arbitrary intermediate node. As an example, the local routing table to the source node of the arbitrary intermediate node may only include the next hop node on the path to the source node of the arbitrary intermediate node, and may not include all the nodes on the path from the arbitrary intermediate node to the source node.

When the third link quality is better than the first threshold (or alternatively, predetermined) link quality, the first node updating unit 205 may take the arbitrary neighbor node of the arbitrary intermediate node as the next hop node to the source node of the arbitrary intermediate node, and add the arbitrary neighbor node into the local routing table to the source node of the arbitrary intermediate node to update the local routing table to the source node of the arbitrary intermediate node.

In some example embodiments, the local routing table to the source node of the arbitrary intermediate node may include the forward next hop node to the source node of the arbitrary intermediate node. When the third backward link quality is better than the first threshold (or alternatively, predetermined) backward link quality, the first node updating unit 205 may take the arbitrary neighbor node of the arbitrary intermediate node as the forward next hop node to the source node of the arbitrary intermediate node, and add the arbitrary neighbor node into the local routing table to the source node of the arbitrary intermediate node to update the local routing table to the source node of the arbitrary intermediate node. Here, the forward next hop node to the source node of the arbitrary intermediate node may refer to a node transmitting the routing request information to the arbitrary intermediate node on a path where the backward link quality from the source node to the arbitrary intermediate node is desirable.

Accordingly, the local routing table to the source node of the arbitrary intermediate node may also include the backward next hop node to the source node of the arbitrary intermediate node. When the third forward link quality is better than the first threshold (or alternatively, predetermined) forward link quality, the first node updating unit 205 may take the arbitrary neighbor node of the arbitrary intermediate node as the backward next hop node to the source node of the arbitrary intermediate node, and add the arbitrary neighbor node into the local routing table to the source node of the arbitrary intermediate node to update the local routing table to the source node of the arbitrary intermediate node. Here, the backward next hop node to the source node of the arbitrary intermediate node may refer to a node transmitting the routing request information to the arbitrary intermediate node on a path where the forward link quality from the source node to the arbitrary intermediate node is desirable.

As an example, a format of the local routing table to the source node of the arbitrary intermediate node can be shown in the Table 4 below.

TABLE 4

| Routing Table | | |
| --- | --- | --- |
| Destination Node | Forward Next Hop | Backward Next Hop |
| S | | |

As shown in Table 4, the local routing table to the source node of the arbitrary intermediate node may include the destination node (e.g., in a process of transmitting the routing request information from the source node to the destination node, the local routing table is updated by taking the source node as the destination node), the forward next hop node to the source node of the arbitrary intermediate node, and the backward next hop node to the source node of the arbitrary intermediate node. In the process of transmitting the routing request information from the source node to the destination node, the respective intermediate node on the path from the source node to the destination node may not only update the link quality in the routing request information, but also update the forward next hop and the backward next hop in the local routing table to the source node of the respective intermediate node. Table 4 may not be a complete list of contents included in the local routing table. For example, Table 4 may include contents such as the source node, the destination node, the sequence number and etc. included in the existing local routing table.

A first forwarding unit 204 may broadcast the updated routing request information to the other neighbor node than the arbitrary neighbor node of the arbitrary intermediate node so that the destination node may, based on the received routing request information, determine the desirable forward path and/or the desirable backward path from the source node to the destination node according to the link quality of the path from the source node to the destination node.

At this time, the arbitrary intermediate node may determine the desirable forward path and/or the desirable backward path from the source node to the arbitrary intermediate node among the paths from the source node to the destination node according to the link quality of the path from the source node to the arbitrary intermediate node.

In some example embodiments, a destination node 30 according an example embodiment of the present disclosure may include second request information receiving unit 301, a second calculating unit 302, a comparing unit 303, a second link quality updating unit 304, a desirable path determining unit 305, and a relay information transmitting unit 306.

For example, the second request information receiving unit 301 may receive the routing request information from the arbitrary neighbor node of the destination node. Here, the routing request information received by the second request information receiving unit 301 may include the fourth link quality, and the fourth link quality may indicate the link quality of the path from the source node to the arbitrary neighbor node of the destination node.

Here, a function of the second request information receiving unit 301 for receiving the routing request information from the arbitrary neighbor node of the destination node has been described in detail in FIG. 10, so this is not repeated in the present disclosure.

The second calculating unit 302 may acquires the sixth link quality according to the acquired fifth link quality and the fourth link quality included in the routing request information received by the second request information receiving unit 301. Here, the fifth link quality may indicate the link quality of the path between the destination node and the arbitrary neighbor node of the destination node, and the sixth link quality may indicate the link quality of the path from the source node to the destination node. For example, the fifth link quality may be acquired through various existing devices. As an example, the fifth link quality may be acquired through the Hello message by adopting the method shown in FIG. 4, and this is not repeated in the present disclosure.

For example, the second calculating unit 302 may extract the fourth link quality from the received routing request information, and add the fifth link quality with the fourth link quality to acquire the sixth link quality. Here, it should be understood that, the link quality of the path from the source node to the destination node may be acquired through various existing methods. In the example embodiment of the present disclosure, a step of acquiring the link quality of the path from the source node to destination node by summating the link qualities between all the neighbor second hop nodes on the path from the source node to the destination node is only an example, the present disclosure is not limited thereto, and the link quality of the path may be acquired through multiplying or other methods.

For example, the second calculating unit 302 may determine a predetermine weight according to the number of nodes included in the path from the source node to the destination node, and applying the threshold (or alternatively, predetermined) weight to the sixth link quality. For example, the predetermined weight is applied to the sum of link qualities of the path from the source node to the destination node. Here, the larger the number of nodes included in the path from the source node to the destination node is, the bigger the negative influence of the desired (or alternatively, predetermined) weight on the sixth link quality will be.

In an example embodiment of the present disclosure, a good or bad link quality may be reflected by a value of the link quality of the path from the source node to the destination node. However, the present disclosure is not limited thereto, and the good or bad link quality of the path from the source node to the destination node may be reflected through various existing methods (for example, the distance value or the delay time from the source node to the destination node may be adopted). That is, the desired (or alternatively, predetermined) weight applied to the link quality of the path from the source node to the destination node does not necessarily refer to reducing the link quality of the path from the source node to the destination node as an increase of the number of nodes included in the path from the source node to the destination node, and may also refer to improving the link quality of the path from the source node to the destination node as an increase of the number of nodes included in the path from the source node to the destination node, as long as the negative influence on the link quality is increased through the desired (or alternatively, predetermined) weight as the increase of the number of nodes included in the path from the source node to the destination node.

The comparing unit 303 compares the sixth link quality with the second threshold (or alternatively, predetermined) link quality, to determine whether the sixth link quality is better than the second threshold (or alternatively, predetermined) link quality. Here, the second threshold (or alternatively, predetermined) link quality may indicate the link quality of the path from the source node to the destination node.

The destination node according to an example embodiment of the present disclosure may further include the fourth storing unit (not shown), and the fourth storing unit may be used to store the local routing cache table from the source node to the destination node of the destination node. The local routing cache table of the destination node may be used to store the second threshold (or alternatively, predetermined) link quality. In this case, the comparing unit 303 may compare the sixth link quality with the second threshold (or alternatively, predetermined) link quality stored in the local routing cache table of the destination node.

When the sixth link quality is not better than the second threshold (or alternatively, predetermined) link quality stored in the local routing cache table of the destination node, the second link quality updating unit 304 may not update the second threshold (or alternatively, predetermined) link quality stored in the local routing cache table of the destination node.

When the sixth link quality is better than the second threshold (or alternatively, predetermined) link quality stored in the local routing cache table of the destination node, the second link quality updating unit 304 may write the sixth link quality into local routing cache table of the destination node, and update the second threshold (or alternatively, predetermined) link quality in the local routing cache table of the destination node.

In some example embodiments, the sixth link quality may include a sixth forward link quality, and the second threshold (or alternatively, predetermined) link quality may include the second threshold (or alternatively, predetermined) forward link quality. In this case, the comparing unit 303 may compare the sixth forward link quality with the second threshold (or alternatively, predetermined) forward link quality stored in the local routing cache table of the destination node. When the sixth forward link quality is better than the second threshold (or alternatively, predetermined) forward link quality, the second link quality updating unit 304 may update the second threshold (or alternatively, predetermined) forward link quality in the local routing cache table of the destination node with the sixth forward link quality. When the sixth forward link quality is not better than the second threshold (or alternatively, predetermined) forward link quality, the second link quality updating unit 304 may not update the second threshold (or alternatively, predetermined) forward link quality stored in the local routing cache table of the destination node.

Accordingly, the sixth link quality may further include the sixth backward link quality, and the second threshold (or alternatively, predetermined) link quality may further include the second threshold (or alternatively, predetermined) backward link quality. In this case, the comparing unit 303 may compare the sixth backward link quality with the second threshold (or alternatively, predetermined) backward link quality stored in the local routing cache table of the destination node. When the sixth backward link quality is better than the second threshold (or alternatively, predetermined) backward link quality, the second link quality updating unit 304 may update the second threshold (or alternatively, predetermined) backward link quality in the local routing cache table of the destination node with the sixth backward link quality. When the sixth backward link quality is not better than the second threshold (or alternatively, predetermined) backward link quality, the second link quality updating unit 304 may not update the second threshold (or alternatively, predetermined) backward link quality stored in the local routing cache table of the destination node.

For example, the fourth storing unit may not only store the local routing cache table of the destination node, but also store the local routing table from the source node to the destination node of the destination node. With respect to the case where the first link quality updating unit 203 uses the source routing mode, the local routing table of the destination node may be used to record all the nodes passing through the path from the source node to the destination node. The desirable path determining unit 305 may determine whether to update the local routing table of the destination node according to the sixth link quality.

For example, when the sixth link quality is better than the second threshold (or alternatively, predetermined) link quality stored in the local routing cache table of the destination node, the desirable path determining unit 305 may add the destination node into the routing table of the routing request message, acquire the path from the source node to the destination node, store the path from the source node to the destination node into the local routing table of the destination node, and update the local routing table of the destination node. When the sixth link quality is not better than the second threshold (or alternatively, predetermined) link quality stored in the local routing cache table of the destination node, the desirable path determining unit 305 may not update the local routing table of the destination node.

As an example, the local routing table of the destination node may include a forward routing table; when the sixth forward link quality is better than the second threshold (or alternatively, predetermined) forward link quality stored in the local routing cache table of the destination node, the desirable path determining unit 305 may store the path from the source node to the destination node into the forward routing table of the destination node, and update the forward routing table of the destination node, and takes the path from the source node to the destination node stored in the forward routing table as the desirable forward path from the source node to the destination node. When the sixth forward link quality is not better than the second threshold (or alternatively, predetermined) forward link quality, the desirable path determining unit 305 may not update the forward routing table of the destination node.

Accordingly, the local routing table of the destination node may further include the backward routing table. When the sixth backward link quality is better than the second threshold (or alternatively, predetermined) backward link quality stored in the local routing cache table of the destination node, the desirable path determining unit 305 may store the path from the destination node to the source node into the backward routing table of the destination node, and update the backward routing table of the destination node, and takes the path from the destination node to the source node stored in the backward routing table as the desirable backward path from the source node to the destination node. When the sixth backward link quality is not better than the second threshold (or alternatively, predetermined) backward link quality, the desirable path determining unit 305 may not update the backward routing table of the destination node.

With respect to the case where the first link quality updating unit 203 uses the distance vector routing mode, the destination node according to the example embodiment of the present disclosure may further include the fifth storing unit (not shown). The fifth storing unit may be used to store the local routing table to the source node of the destination node. The local routing table to the source node of the destination node may include the next hop node of the path to the source node of the destination node. The desirable path determining unit 305 may determine whether to update the local routing table to the source node of the destination node according to the sixth link quality.

For example, when the sixth link quality is better than the second threshold (or alternatively, predetermined) link quality stored in the local routing cache table of the destination node, the desirable path determining unit 305 may take the arbitrary neighbor node of the destination node as the next hop node of the path to the source node of the destination node, and add the arbitrary neighbor node into the local routing table of the destination node, to update the local routing table of the destination node.

As an example, the local routing table to the source node of the destination node may include the forward next hop node to the source node of the destination node. When the sixth backward link quality is better than the second threshold (or alternatively, predetermined) backward link quality stored in the local routing cache table of the destination node, the desirable path determining unit 305 may take the arbitrary neighbor node of the destination node as the forward next hop node to the source node of the destination node, and add the arbitrary neighbor node into the local routing table of the destination node, and update the local routing table of the destination node. Here, the forward next hop node to the source node of the destination node may refer to a node transmitting the routing request information to the destination node on a path where the backward link quality from the source node to the destination node is desirable.

Accordingly, the local routing table to the source node of the destination node may further include the backward next hop node to the source node of the destination node. When the sixth forward link quality is better than the second threshold (or alternatively, predetermined) forward link quality stored in the local routing cache table of the destination node, the desirable path determining unit 305 may take the arbitrary neighbor node of the destination node as the backward next hop node to the source node of the destination node, add the arbitrary neighbor node into the local routing table of the destination node, and update the local routing table of the destination node. Here, the backward next hop node to the source node of the destination node may refer to a node transmitting the routing request information to the destination node on a path where the forward link quality from the source node to the destination node is desirable.

At this time, the destination node may determine the desirable forward path and/or the desirable backward path from the source node to the destination node according to the link quality of the path from the source node to the destination node.

The reply information transmitting unit 306 may transmit the reply information to the source node through the backward path of the desirable backward path and/or the desirable forward path, for the source node to transmit data to the destination node based on the reply information.

With respect to the case where the first link quality updating unit 203 uses the source routing mode, the reply information may include the desirable forward path and/or the desirable backward path from the source node to the destination node, for the source node to transmit data to the destination node through the forward path of the desirable forward path and/or the desirable backward path.

In one case, the reply information transmitting unit 306 may transmit the reply information carrying the desirable forward path and/or the desirable backward path from the source node to the destination node, to the source node through the desirable backward path. In an example embodiment of the present disclosure, the reply information may be transmitted to the source node for example through the desirable backward path. Here, the desirable backward path is a desirable path transmitting data from the destination node to the source node, and by transmitting the reply information along the path, the stability and rapidity of data transmission from the destination node to the source node may be guaranteed.

In another case, the reply information transmitting unit 306 may transmit the reply information carrying the desirable forward path and/or the desirable backward path from the source node to the destination node, to the source node through the backward path of the desirable forward path. For example, when the backward link quality of the desirable forward path is better (namely when it is detected that the backward link quality of the desirable forward path is not lower than a link quality threshold), the destination node may transmit the reply information to the source node through the backward path of the desirable forward path.

In still another case, the reply information transmitting unit 306 may transmit the reply information carrying the desirable forward path from the source node to the destination node, to the source node through the backward path of the desirable forward path and the desirable backward path simultaneously or concurrently, to improve the stability of data transmission from the destination node to the source node.

In this case, the first reply information receiving unit 207 of the arbitrary intermediate node may receive the reply information from the reply information transmitting unit 306 of the destination node, for the source node to transmit data to the destination node based on the reply information.

In an asymmetric link of an example embodiment of the present disclosure, in the source routing mode, after receiving a reply message, the source node S may parse the reply message, and the source node S may acquire the desirable forward path and/or the desirable backward path. The source node S may transmit data to the destination node D through the desirable forward path, but if the desirable forward path is blocked, then a routing maintenance stage is entered. In such a stage, the source node S may transmit data to the destination node D through the forward path of the desirable backward path, and the source node S will need to re-initiate a routing request only when the desirable forward path and the forward path of the desirable backward path are both blocked.

With respect to the case where the first link quality updating unit 203 uses the distance vector routing mode, the reply information may include the forward reply information. In this case, the reply information transmitting unit 306 may transmit the forward reply information to the backward next hop node to the source node of the destination node stored in the local routing to the source node table of the destination node, for the source node to determine the forward next hop node from the source node to the destination node according to the forward reply information so that the source node may transmit data to the destination node through the forward next hop node from the source node to the destination node.

In this case, the first reply information receiving unit 207 of the arbitrary intermediate node may receive the forward reply information from the reply information transmitting unit 306 of the destination node, for the source node to transmit data to the destination node based on the forward reply information.

For example, the arbitrary intermediate node according to an example embodiment of the present disclosure may further include a second storing unit (not shown) for storing the local routing table to the destination node of the arbitrary intermediate node. The local routing table to the destination node of the arbitrary intermediate node may only include the forward next hop node to the destination node of the arbitrary intermediate node, and may not include all the nodes on the path from the arbitrary intermediate node to the destination node.

For example, after the first reply information receiving unit 207 receives the forward reply information from the previous hop node in the direction from the destination node to the source node, the first node updating unit 205 may take the previous hop node in the direction from the destination node to the source node of the arbitrary intermediate node as the forward next hop node to the destination node of the arbitrary intermediate node, and add the previous hop node into the local routing table to the destination node of the arbitrary intermediate node, and update the local routing table to the destination node of the arbitrary intermediate node. The second forwarding unit 208 may forward the forward reply information to the backward next hop node to the source node of the arbitrary intermediate node stored in the local routing table to the source node of the arbitrary intermediate node. The previous hop node mentioned herein may refer to a node transmitting the forward reply information to a node receiving the forward reply information. The forward reply information may include a forward identifier, the node which has received the forward reply information may update the forward next hop node to the destination node in the local routing table of the node according to the forward identifier.

Accordingly, the third storing unit 104 of the source node 10 may be used for storing the local routing table of the source node. The local routing table of the source node may only include the forward next hop node to the destination node of the source node, and may not include all the nodes on the path from the source node to the destination node.

In some example embodiments, a source node 10 may further include a second reply information receiving unit 102 and a second node updating unit 103.

For example, after the second reply information receiving unit 102 receives the forward reply information from the previous hop node in the direction from the destination node to the source node, The second node updating unit 103 may take the previous hop node of the source node in the direction from the destination node to the source node as the forward next hop node to the destination node of the source node and adds the previous hop node into the local routing table of the source node, and update the local routing table of the source node.

In another example, the reply information may further include the backward reply information. In this case, the reply information transmitting unit 306 transmits the backward reply information including information on the desirable forward path from the source node to the destination node to the forward next hop node to the source node of the destination node stored in the local routing table of the destination node, for the source node to transmit data to the destination node according to the backward reply information.

In this case, the first reply information receiving unit 207 of the arbitrary intermediate node may receive the backward reply information from the reply information transmitting unit 306 of the destination node, for the source node to transmit data to the destination node based on the backward reply information.

For example, the local routing table to the destination node of the arbitrary intermediate node may also include the backward next hop node to the destination node of the arbitrary intermediate node.

For example, after the first reply information receiving unit 207 receives the backward reply information from the previous hop node in the direction from the destination node to the source node, the first node updating unit 205 may take the previous hop node in the direction from the destination node to the source node of the arbitrary intermediate node as the backward next hop node to the destination node of the arbitrary intermediate node, and add the previous hop node into the local routing table to the destination node of the arbitrary intermediate node, and update the local routing table to the destination node of the arbitrary intermediate node. The second forwarding unit 208 may forward the backward reply information to the forward next hop node to the source node of the arbitrary intermediate node stored in the local routing table to the source node of the arbitrary intermediate node. The previous hop node mentioned herein may refer to the node transmitting the backward reply information to the node receiving the backward reply information. The backward reply information may include a backward identifier. The node which has received the backward reply information may update the backward next hop node to the destination node in the local routing table of the node according to the backward identifier.

Accordingly, the local routing table of the source node may further include the backward next hop node to the destination node of the source node.

For example, after the second reply information receiving unit 102 receives the backward reply information from the previous hop node in the direction from the destination node to the source node, the second node updating unit 103 may take the previous hop node of the source node in the direction from the destination node to the source node as the backward next hop node to the destination node of the source node, add it into the local routing table of the source node, and update the local routing table of the source node.

In some example embodiments, a source node may further include a data transmitting unit (not shown). The time for the second reply information receiving unit 102 to receive the forward reply information and the time for the second reply information receiving unit 102 to receive the backward reply information may be different in sequence. When the time for the second reply information receiving unit 102 to receive the forward reply information is earlier than the time for the second reply information receiving unit 102 to receive the backward reply information, the forward next hop node from the source node to the destination node has already been established in the local routing table of each node on the path from the source node to the destination node so the data transmitting unit may transmit data to the destination node based on the local routing table of each node on the path from the source node to the destination node.

For example, when the time for the second reply information receiving unit 102 to receive the backward reply information is earlier than the time for the second reply information receiving unit 102 to receive the forward reply information, the data transmitting unit determines whether the source node transmits data to the backward next hop node from the source node to the destination node in the routing table of the source node according to the relevant information of the desirable forward path from the source node to the destination node included in the backward reply information.

As an example, the relevant information of the desirable forward path from the source node to the destination node may include the backward link quality of the desirable forward path and the forward link quality of the desirable backward path. Here, the backward link quality of the desirable forward path may be an ratio between the backward link quality of the desirable forward path and the link quality of the desirable backward path, the forward link quality of the desirable backward path may be an ratio between the forward link quality of the desirable backward path and the link quality of the desirable forward path.

When the time for the second reply information receiving unit 102 to receive the forward reply information is earlier than the time for the second reply information receiving unit 102 to receive the backward reply information, the data transmitting unit may transmit data to the forward next hop node from the source node to the destination node in the routing table of the source node.

Here, the functions of the second reply information receiving unit 102 and the data transmitting unit have been described in detail in FIGS. 19 and 20, so this is not repeated in the present disclosure.

For example, a destination node according to an example embodiment of the present disclosure may further include a data receiving unit (not shown), which determine whether to re-transmit the forward reply information to the source node according to the data received from the source node and an identification field value.

Here, the function of the data receiving unit has been described in detail in FIG. 21, so this is not repeated in the present disclosure.

Further, in an example embodiment of the present disclosure, a system of selecting a routing in an asymmetric link may be provided, and the system may include a source node, a node network, and a destination node. Here, the functions of the source node, the node network, and the destination node included in the system have been described in detail above, so this is not repeated in the present disclosure.

Further, the method of selecting the routing in the asymmetric link according to the example embodiment of the present disclosure may be implemented as a computer program code, which includes program instructions, software components, software modules, data files, data structures, and/or the like that are implemented by one or more physical hardware devices, in a computer readable recording medium. Examples of computer program code include both machine code produced by a compiler and higher level program code that is executed using an interpreter. Those skilled in the art may implement the computer program code according to the description for the above method. When the computer code may be performed in a computer, the above method of the present disclosure is implemented.

The computer program code, software and/or data may be embodied permanently or temporarily in any type of machine, component, physical or virtual equipment, or computer storage medium or device, capable of providing instructions or data to, or being interpreted by, a hardware device. The computer program code, software and/or data also may be distributed over network coupled computer systems so that the software is stored and executed in a distributed fashion. In particular, for example, software and data may be stored by one or more computer readable recording mediums, including the tangible or non-transitory computer-readable storage media discussed herein.

The non-transitory computer-readable storage medium may include, for example, random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

In addition, a respective unit in an apparatus for selecting a routing in an asymmetric link according to an example embodiment of the present disclosure may be implemented as hardware. Those skilled in the art may implement the respective unit with, for example, a field-programmable gate array (FPGA) or an application-specific integrated circuit (ASIC), according to a process performed by a respective defined unit. The hardware may include one or more processors. The one or more processors are computer processing devices configured to carry out the computer program code by performing arithmetical, logical, and input/output operations. Once the program computer code is loaded into the one or more processors, the one or more processors may be programmed to perform the program code, thereby transforming the one or more processors into special purpose processor(s).

The above respective nodes in the system of selecting the routing in the asymmetric link may implement all the functions mentioned above to determine a desirable routing, thereby improving a performance of a router. However, the present disclosure is not limited thereto, and the respective nodes may be implemented to perform only some of the functions mentioned above to reduce a size of the system.

Although the present disclosure has been particularly shown and described with reference to some exemplary embodiments thereof, it shall be understood by those skilled in the art that various changes in form and details may be made therein without departing from the spirit and scope of the present disclosure as defined by the accompanying claims.

What is claimed:

1. A method of selecting a routing in an asymmetric link, the asymmetric link including a source node, a node network, and a destination node, the node network including at least one intermediate node, the method comprising:
   receiving, by an arbitrary intermediate node of the at least one intermediate node, routing request information from an arbitrary neighbor node of the arbitrary intermediate node, the routing request information including a first link quality, the first link quality indicating a link quality of a path from the source node to the arbitrary neighbor node;
   acquiring, by the arbitrary intermediate node, a second link quality, the second link quality indicating a link quality of a path between the arbitrary intermediate node and the arbitrary neighbor node;
   acquiring, by the arbitrary intermediate node, a third link quality based on the second link quality and the first link quality included in the received routing request information, the third link quality indicating a link quality of a path from the source node to the arbitrary intermediate node;
   updating, by the arbitrary intermediate node, the first link quality in the routing request information with the third link quality; and
   broadcasting, by the arbitrary intermediate node, an updated routing request information to other neighbor node than the arbitrary neighbor node of the arbitrary intermediate node for the destination node to determine at least one of a forward path or an backward path from the source node to the destination node based on the received routing request information and a link quality of a path from the source node to the destination node,
   wherein the updating the first link quality further includes,
      comparing the third link quality with a first threshold link quality, the first threshold link quality indicating a threshold link quality of the path from the source node to the arbitrary intermediate node stored by the arbitrary intermediate node, and
      updating the first link quality in the routing request information with the third link quality in response to the third link quality being better than the first threshold link quality, and
   wherein in response to the arbitrary intermediate node including a local routing table to the source node of the arbitrary intermediate node and the local routing table including a next hop node to the source node of the arbitrary intermediate node, the updating the first link quality further includes,
      updating the local routing table to the source node of the arbitrary intermediate node by taking the arbitrary neighbor node of the arbitrary intermediate node as the next hop node to the source node of the arbitrary intermediate node in response to the third link quality being better than the first threshold link quality, and
      adding the arbitrary neighbor node of the arbitrary intermediate node into the local routing table to the source node of the arbitrary intermediate node.

2. The method of claim 1, wherein in response to the routing request information further including a routing table, which records all nodes on a path from the source node to a neighbor node of the arbitrary intermediate node, the updating the first link quality further includes adding the arbitrary intermediate node into the routing table in response to the third link quality being better than the first threshold link quality.

3. The method of claim 1, wherein in response to the local routing table to the source node of the arbitrary intermediate node further including a forward next hop node to the source node of the arbitrary intermediate node, the third link quality including a third backward link quality, and the first threshold link quality including a first threshold backward link quality, and the updating the local routing table to the source node of the arbitrary intermediate node is performed by taking, by the arbitrary intermediate node, the arbitrary neighbor node of the arbitrary intermediate node as the forward next hop node to the source node of the arbitrary intermediate node in response to the third backward link quality being better than the first threshold backward link quality, and adding the arbitrary neighbor node of the arbitrary intermediate node into the local routing table to the source node of the arbitrary intermediate node.

4. The method of claim 1, further comprising:

receiving, by the arbitrary intermediate node, reply information from a previous hop node in a direction from the destination node to the source node; and forwarding the reply information to the source node for the source node to transmit data to the destination node based on the reply information.

5. The method of claim 4, wherein the reply information carries the at least one of a forward path or a backward path from the source node to the destination node.

6. The method of claim 4, wherein in response to the reply information including forward reply information, the arbitrary intermediate node further including a local routing table to the destination node of the arbitrary intermediate node, and the local routing table including a forward next hop node to the destination node of the arbitrary intermediate node, the receiving reply information further includes,
receiving, by the arbitrary intermediate node, the forward reply information from the previous hop node in the direction from the destination node to the source node,
updating the local routing table to the destination node of the arbitrary intermediate node by taking the previous hop node of the arbitrary intermediate node as the forward next hop node to the destination node of the arbitrary intermediate node, and adding the previous hop node to the local routing table to the destination node of the arbitrary intermediate node, and
forwarding the forward reply information to a forward next hop node to the source node of the arbitrary intermediate node stored in a local routing table to the source node of the arbitrary intermediate node.

7. The method of claim 6, wherein in response to the source node including the local routing table, and the local routing table of the source node including the forward next hop node to the destination node of the source node, the method further includes,
receiving, by the source node, the forward reply information from the previous hop node in the direction from the destination node to the source node, and
updating the local routing table of the source node by taking a previous hop node of the source node as a forward next hop node to the destination node of the source node, and adding the previous hop node of the source node to the local routing table of the source node.

8. The method of claim 7, wherein in response to the reply information further including backward reply information, and the local routing table to the destination node of the arbitrary intermediate node further including a backward next hop node to the destination node of the arbitrary intermediate node, the receiving reply information further includes,
receiving, by the arbitrary intermediate node, the backward reply information from the previous hop node in the direction from the destination node to the source node,
updating the local routing table to the destination node of the arbitrary intermediate node by taking the previous hop node of the arbitrary intermediate node as the backward next hop node to the destination node of the arbitrary intermediate node, and adding the previous hop node of the arbitrary intermediate node into the local routing table to the destination node of the arbitrary intermediate node, and
forwarding the backward reply information to the forward next hop node to the source node of the arbitrary intermediate node stored in the local routing table to the source node of the arbitrary intermediate node.

9. A method of selecting a routing in an asymmetric link, the asymmetric link including a source node, a node network, and a destination node, the node network including at least one intermediate node, the method comprising:

receiving, by the destination node, routing request information from an arbitrary neighbor node of the destination node, the routing request information including a first link quality, the first link quality indicating a link quality of a path from the source node to the arbitrary neighbor node of the destination node;

acquiring, by the destination node, a second link quality, the second link quality indicating a link quality of a path between the destination node and the arbitrary neighbor node of the destination node;

acquiring, by the destination node, a third link quality according based on the second link quality and the first link quality included in the routing request information received by the destination node, and the third link quality indicating a link quality of a path from the source node to the destination node; and determining at least one of a forward path or a backward path from the source node to the destination node based on the third link quality, wherein the acquiring a third link quality includes acquiring, by the destination node, the third link quality by adding the first link quality with the second link quality or multiplying the first link quality by the second link quality.

10. The method of claim 9, wherein the routing request information received by the destination node is routing request information acquired after the at least one intermediate node updates routing request information previously broadcasted by the source node to the destination node.

11. The method of claim 9, wherein the acquiring a third link quality includes, determining a weight according to a number of nodes included in the path from the source node to the destination node, and applying the weight to the third link quality.

12. The method of claim 9, wherein in response to the destination node including a local routing buffer table, the local routing buffer table of the destination node configured to store a first threshold link quality, the first threshold link quality indicating a threshold link quality of the path from the source node to the destination node, the determining at least one of a forward path or a backward path further includes, comparing the third link quality with the first threshold link quality, and updating the first threshold link quality in the local routing buffer table of the destination node by writing the third link quality into the local routing buffer table of the destination node in response to the third link quality being better than the first threshold link quality.

13. The method of claim 12, wherein in response to the destination node further including a local routing table, and the local routing table of the destination node configured to store all nodes passed by the path from the source node to the destination node, the determining at least one of a forward path or a backward path further includes updating the local routing table of the destination node by, adding the destination node into a routing table of a routing request message to acquire the path from the source node to the destination node, and storing the path from the source node to the destination node into the local routing table of the destination node, in response to the third link quality being better than the first threshold link quality.

14. The method of claim 13, wherein in response to the local routing table of the destination node including at least one of a forward routing table or a backward routing table, the third link quality including at least one of a third forward link quality or a third backward link quality, and a second threshold link quality including at least one of a second threshold forward link quality or a second threshold backward link quality, the determining at least one of a forward path or a backward path includes at least one of, comparing, by the destination node, the third forward link quality with the second threshold forward link quality, updating the forward routing table of the destination node by storing the path from the source node to the destination node into the forward routing table of the destination node in response to the third forward link quality being better than the second threshold forward link quality, and taking the path as the forward path from the source node to the destination node, or comparing, by the destination node, the third backward link quality with the second threshold backward link quality, updating the backward routing table of the destination node by storing the path from the destination node to the source node into the backward routing table of the destination node in response to the third backward link quality being better than the second threshold backward link quality, and taking the path as the backward path from the source node to the destination node.

15. The method of claim 12, wherein in response to the destination node having a local routing table, the local routing table of the destination node including a next hop node to the source node of the destination node, the determining at least one of a forward path or a backward path further includes updating the local routing table of the destination node by taking the arbitrary neighbor node of the destination node as the next hop node from the destination node to the source node and adding the arbitrary neighbor node into the local routing table of the destination node in response to the third link quality being better than the first threshold link quality.

16. The method of claim 15, wherein in response to the local routing table of the destination node including a backward next hop node to the source node of the destination node, the third link quality including a third forward link quality, and the first threshold link quality including a first threshold forward link quality, the determining at least one of a forward path or a backward path includes updating the local routing table of the destination node by taking the arbitrary neighbor node of the destination node as the backward next hop node to the source node of the destination node and adding the arbitrary neighbor node into the local routing table of the destination node in response to the third forward link quality being better than the first threshold link quality.

17. A system of selecting a routing in an asymmetric link, the system including a source node, a node network, and a destination node, the node network including at least one intermediate node, wherein the source node is configured to transmit routing request information to the destination node via the at least one intermediate node included in the node network, an arbitrary intermediate node of the at least one intermediate node is configured to, receive the routing request information including a first link quality from an arbitrary neighbor node of the arbitrary intermediate node, the first link quality indicating a link quality of a path from the source node to the arbitrary neighbor node, acquire a second link quality, the second link quality indicating a link quality of a path between the arbitrary intermediate node and the arbitrary neighbor node, acquire a third link quality based on the second link quality and the first link quality included in the received routing request information, the third link quality indicating a link quality of a path from the source node to the arbitrary intermediate node, update the first link quality in the routing request information with the third link quality, and broadcast an updated routing request information to other neighbor node than the arbitrary neighbor node of the arbitrary intermediate node, and the destination node is configured to, receive routing request information including a fourth link quality from an arbitrary neighbor node of the destination node, the fourth link quality indicating a link quality of a path from the source node to the arbitrary neighbor node of the destination node, acquire a fifth link quality, the fifth link quality indicating a link quality of a path between the destination node and the arbitrary neighbor node of the destination node, acquire a sixth link quality based on the fifth link quality and the fourth link quality included in the routing request information received by the destination node, the sixth link quality indicates a link quality of a path from the source node to the destination node, and determine at least one of a forward path or a backward path from the source node to the destination node based on the sixth link quality, wherein the arbitrary intermediate node of the at least one intermediate node is configured to update the first link quality by, comparing the third link quality with a first threshold link quality, the first threshold link quality indicating a threshold link quality of the path from the source node to the arbitrary intermediate node stored by the arbitrary intermediate node, and updating the first link quality in the routing request information with the third link quality in response to the third link quality being better than the first threshold link quality, and wherein when the arbitrary intermediate node includes a local routing table to the source node of the arbitrary intermediate node and the local routing table includes a next hop node to the source node of the arbitrary intermediate node, the arbitrary intermediate node of the at least one intermediate node is configured to update the first link quality further by, updating the local routing table to the source node of the arbitrary intermediate node by taking the arbitrary neighbor node of the arbitrary intermediate node as the next hop node to the source node of the arbitrary intermediate node in response to the third link quality being better than the first threshold link quality, and adding the arbitrary neighbor node of the arbitrary intermediate node into the local routing table to the source node of the arbitrary intermediate node.

\* \* \* \* \*